(12) United States Patent
Ogata

(10) Patent No.: US 7,697,396 B2
(45) Date of Patent: Apr. 13, 2010

(54) OPTICAL INTEGRATED UNIT AND OPTICAL PICKUP DEVICE INCLUDING SAME

(75) Inventor: Nobuo Ogata, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 510 days.

(21) Appl. No.: 11/660,824

(22) PCT Filed: Jun. 17, 2005

(86) PCT No.: PCT/JP2005/011134

§ 371 (c)(1),
(2), (4) Date: Feb. 21, 2007

(87) PCT Pub. No.: WO2006/022068

PCT Pub. Date: Feb. 3, 2006

(65) Prior Publication Data

US 2007/0242572 A1    Oct. 18, 2007

(30) Foreign Application Priority Data

Aug. 25, 2004  (JP) .............................. 2004-245925

(51) Int. Cl.
*G11B 7/00*   (2006.01)
(52) U.S. Cl. ............................... 369/112.1; 369/112.12; 369/112.16
(58) Field of Classification Search ................... None
See application file for complete search history.

(56) References Cited

U.S. PATENT DOCUMENTS 5,712,843 A * 1/1998 Chao et al. ............. 369/112.12
5,790,502 A * 8/1998 Horinouchi et al. ..... 369/112.09

6,728,035 B2 * 4/2004 Takasuka et al. ........... 359/569

(Continued)

FOREIGN PATENT DOCUMENTS

JP    07-029202    1/1995

(Continued)

OTHER PUBLICATIONS

N. Ogata et al., "Spherical Aberration Error Signal Detection for Blu-Ray Disc Optical Pickups(II)" Extended Abstracts (The 52nd Spring Meeting, 2005): The Japan Society of Applied Physics and Related Societies No. 3, Mar. 29, 2005, 1a-ZH-13.

*Primary Examiner*—Paul Huber
(74) *Attorney, Agent, or Firm*—Edwards Angell Palmer & Dodge LLP; David G. Conlin; Peter J. Manus

(57) ABSTRACT

An optical integrated unit includes a semiconductor laser (11), a polarized light beam splitter (14), a light receiving element (12), and a polarized light diffraction element (15) for diffracting an optical beam (20) and returning light. The polarized light diffraction element (15) is so provided as to receive the light beam (20) having passed through a polarized light beam splitter surface (14a), and as to diffract the returning light such that an optical path of the returning light is changed to lead to the light receiving element (12). This makes it possible to provide (i) an optical integrated unit in which the beam diameter of light incidenting on a diffraction element is large and in which an optical path length from the diffraction element to a light receiving element is long, and (ii) an optical pickup device including such an optical integrated unit.

14 Claims, 14 Drawing Sheets

U.S. PATENT DOCUMENTS

| | | |
|---|---|---|
| 7,369,479 B2 * | 5/2008 | Ogawa et al. .......... 369/112.04 |
| 7,483,360 B2 * | 1/2009 | Masui et al. ................. 369/120 |
| 2002/0057359 A1 | 5/2002 | Tadano et al. |
| 2003/0072047 A1 | 4/2003 | Funato et al. |
| 2005/0141391 A1 * | 6/2005 | Ueyama et al. .......... 369/112.1 |

FOREIGN PATENT DOCUMENTS

| | | |
|---|---|---|
| JP | 09-44893 | 2/1997 |
| JP | 09-128790 | 5/1997 |
| JP | 11-203707 | 7/1999 |
| JP | 2000-11443 | 1/2000 |
| JP | 2001-250250 | 9/2001 |
| JP | 2001-273666 | 10/2001 |
| JP | 2001-283456 | 10/2001 |
| JP | 2002-157771 | 5/2002 |
| JP | 2003-338076 | 11/2003 |

* cited by examiner

F I G. 3
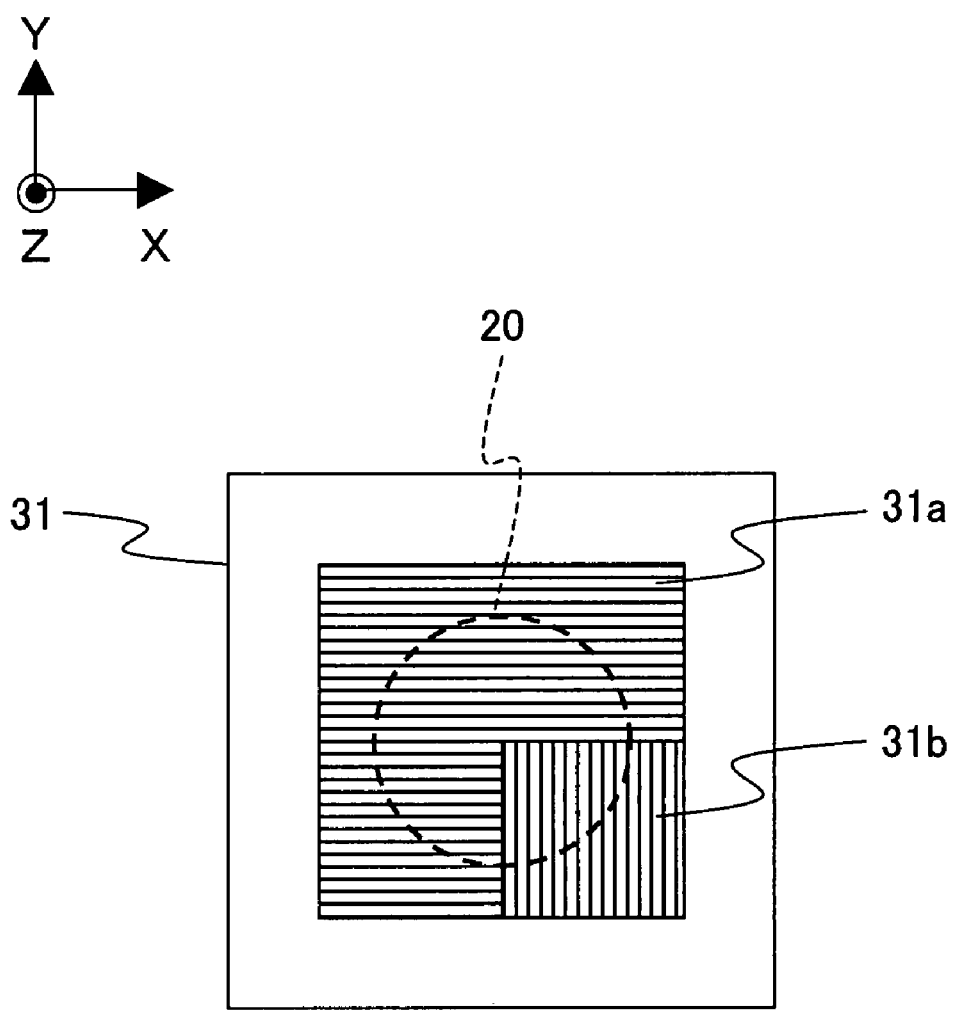

F I G. 4
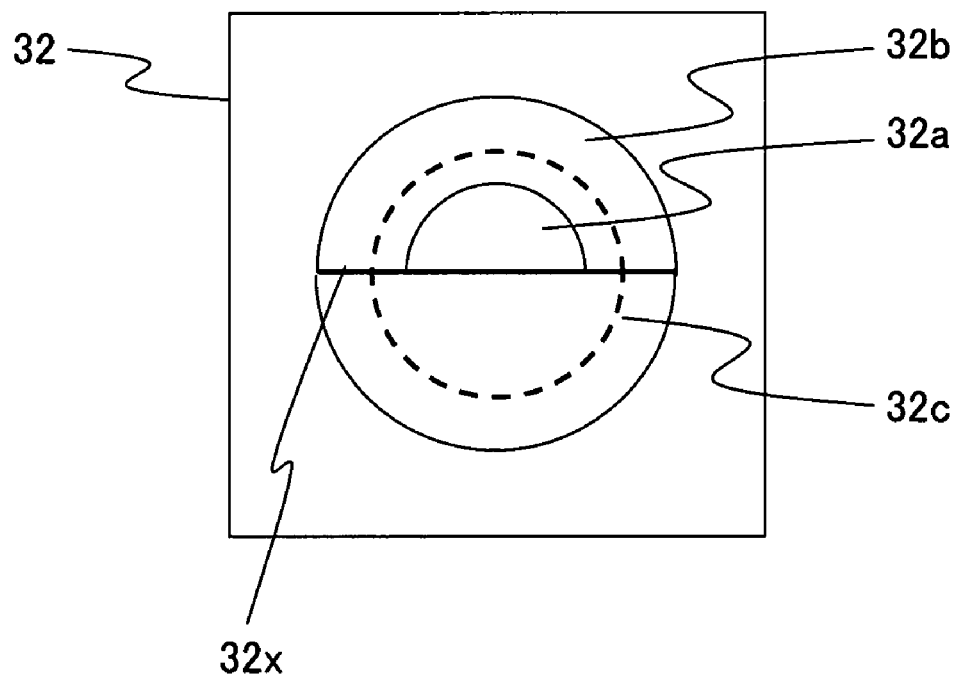

F I G. 7
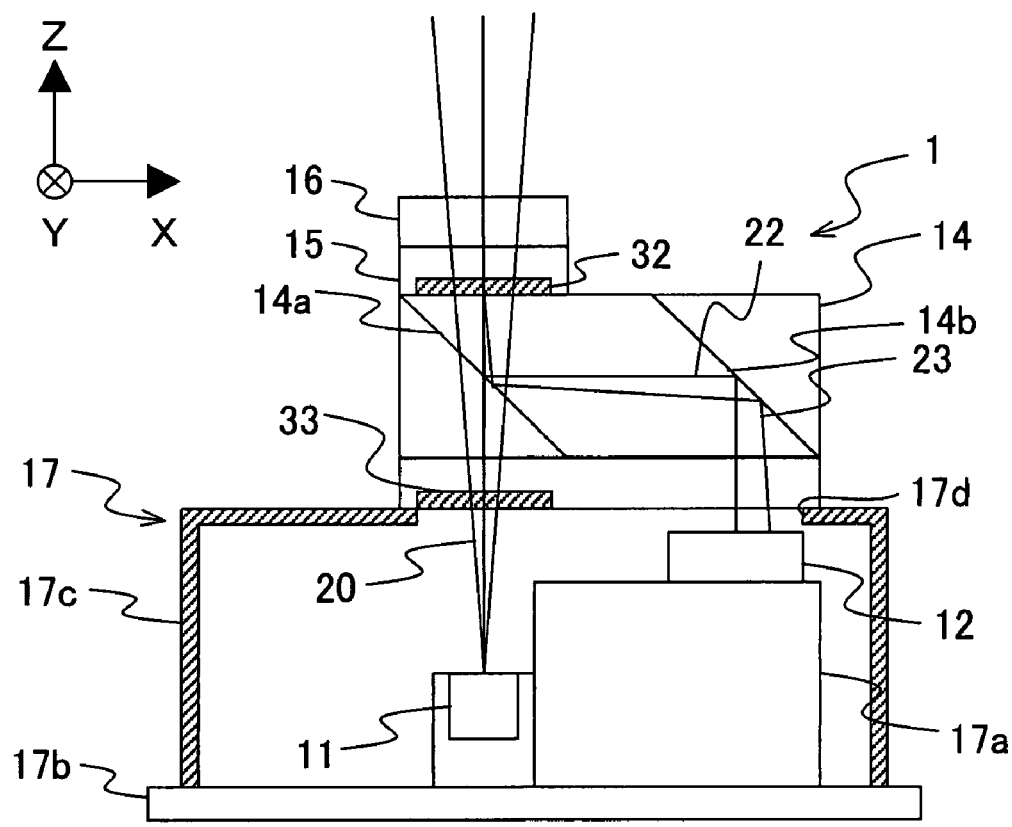

OPTICAL INTEGRATED UNIT AND OPTICAL PICKUP DEVICE INCLUDING SAME

CROSS REFERENCE TO RELATED APPLICATIONS

This application claims priority from International Application No. PCT/JP2005/011134 filed Jun. 17, 2005, which in turn claims priority from Japanese Application 2004-245925 filed Aug. 25, 2004, the teaching of both being incorporated herein by reference.

1. Technical Field

The present invention relates to an optical integrated unit and an optical pickup device including the optical integrated unit. More specifically, the present invention relates to (i) an optical integrated unit for realizing downsizing of an optical pickup used to record information onto an optical recording medium such as an optical disk or to reproduce (play back) information from an optical recording medium, and (ii) an optical pickup device including the optical integrated unit.

2. Background Art

Strongly demanded in recent years are (i) higher density and larger information recording volume in an optical information recording medium such as an optical disk for the sake of recording high quality moving images, and (ii) downsizing and weight saving of an optical pickup device for the sake of using such an optical disk for a mobile purpose.

As accompanied with such demands for downsizing and weight saving, various integrated pickups are proposed. For example, Patent citation 1 (Japanese Unexamined Patent Publication Tokukai 2001-273666 (published on Oct. 5, 2001) proposes (i) an optical integrated unit including a hologram element and a beam splitter, and (ii) an optical pickup device including the optical integrated unit. The following explains principles of the optical integrated unit and the optical pickup device, with reference to FIG. 13 through FIG. 15.

FIG. 13 is a diagram illustrating a structure of the optical pickup device. The optical integrated unit 101 has a light source for emitting outgoing light. The outgoing light is caused to be parallel light by a collimator lens 102. Then, the parallel light passes through an objective lens, with the result that the light is collected on an optical disk 104. The light is reflected by the optical disk 104 to be returning light, and the returning light passes through the objective lens 103 and the collimator lens 102. Then, the returning light is collected on a light receiving element provided in the optical integrated unit 101. The optical disk 104 is made up of a substrate 104a, a cover layer 104b through which light beams pass, and a recording layer 104c for use in information recording/reproducing.

FIG. 14 is a diagram illustrating a detailed structure of the optical integrated unit 101. The outgoing light 120 (optical axis center 122) emitted from the semiconductor laser (light source) 105 is divided by a three-beam diffraction grating 106 into a main beam (O-order diffraction light beam) and two sub beams ($\pm 1^{st}$ diffraction light beams). The beams pass through a polarized light beam splitter (PBS) surface 107a of a complex prism 107, pass through a ¼ wavelength plate 108, and goes to the collimator lens 102. For simplicity, the sub beams ($\pm 1^{st}$ order diffraction light beams) are not illustrated in FIG. 14.

In the meanwhile, the returning light 121 passes through the ¼ wavelength plate 108, and is reflected by the PBS surface 107a and a reflecting mirror surface 107b of the complex prism 107, with the result that the reflected light enters a hologram element 109. The returning light 121 thus having entered the hologram element 109 is diffracted and divided into $+1^{st}$ order diffraction light beams (optical axis center 125a) and $-1^{st}$ diffraction light beams (optical axis center 125b), and then enters the light receiving element 101. For simplicity, with regard to the returning light 121, FIG. 14 merely illustrates light beams respectively corresponding to the optical axis centers.

Here, the outgoing light emitted from the semiconductor laser 105 is light (P polarized light) linearly polarized in the x axis direction. The outgoing light beams having passed through the PBS surface 107a are caused to be circularly polarized by the ¼ wavelength plate 108, and enter the optical disk 104. The returning light from the optical disk 104 enters the ¼ wavelength plate 108, with the result that the returning light becomes light (S polarized light) linearly polarized in the y axis direction. Then, the linearly polarized light is reflected by the PBS surface 107a.

As such, the main beam and the sub beams obtained from the outgoing light emitted from the semiconductor laser 105 are almost entirely led to the optical disk 104, and the returning light is almost entirely led to the light receiving element 110, so that light utilization efficiency is high.

FIG. 15 is an explanatory diagram illustrating a hologram pattern of the hologram element 109 and a pattern of light receiving sections of the light receiving element 110. The hologram element 109 is divided into three regions 109a through 109c by dividing lines 109x and 109y. The dividing line 109x extends in the x axis direction, which corresponds to the tracking direction of the optical disk 104, whereas the dividing line 109y extends in the y axis direction, which corresponds to a direction along a track of the optical disk 104. The light receiving element 110 is made up of (i) six light receiving sections 110a through 110f, which detect the $+1^{st}$ order diffraction light beams obtained by the hologram element 109, and (ii) three light receiving sections, which detect the $-1^{st}$ order diffraction light beams obtained by the hologram element 109. The $+1^{st}$ order diffraction light beams are used to detect a focus error signal (FES) in accordance with the single knife edge method, and to detect a tracking error signal (TES) in accordance with the differential push-pull (DPP) method. The $-1^{st}$ order diffraction light beams are used to detect an information signal (RF signal) and detect the TES in accordance with the differential phase detection (DPD) method.

Generally, when carrying out servo signal detection such as the FES detection and the TES detection using the DPP method, the frequency response of the light receiving element is sufficiently lower than that for use in detecting the RF signal. On the other hand, for the detection of the RF signal and the TES detection using the differential phase detection method, a high-speed responsive light receiving element is required.

Meanwhile, there are two demands in designing of the light receiving element 110: (1) a demand of reducing the areas of the light receiving sections used for the detection of the RF signal and (2) a demand of maintaining the large size of the areas of the light receiving sections used for the FES detection. The demand (1) arises for attainment of high-speed reproduction of the RF signal. The demand (2) arises for the sake of securing a sufficient acquisition range for the FES, although the response in detecting the FES may be slow. However, it is difficult to satisfy these demands at the same time. In order to simultaneously attain the high-speed reproduction of the RF signal and the securing of the acquisition range for the FES, the conventional technique uses the $\pm 1^{st}$ order diffraction light beams for generation of the different signals.

In such an optical integrated unit as described in the conventional technique, the diffraction grating 106 for generating the three beams is provided in the light source 105 side of the complex prism 107, and the hologram element 109 for generating the servo signals is provided in the light receiving element 110 side of the complex prism 107 as shown in FIG. 14. Accordingly, a distance (optical path length) from the light source to the diffraction grating 106 is short and a distance (optical path length) from the light receiving element 110 to the hologram element 109 is short, so that each of the light beams entering each of the diffraction elements (diffraction grating 106 and the hologram element 109) is caused to have a small beam diameter. This is a problem.

Specifically, the following problem arises when the beam diameter of the light beam entering the diffraction element is small.

For example, consider such an optical system that the collimator lens 103 has an effective NA of approximately 0.1 and the distance from the light source 105 to the diffraction grating 106 (and the distance from the hologram element 109 to the light receiving element 110) are set at approximately 1 mm to approximately 2 mm on the basis of optical path length in the air. In this case, the light beam incidenting on the diffraction element has a beam diameter $\phi$ falling within an range of approximately 0.2 mm to 0.4 mm. In cases where the beam diameter of the light beam incidenting on the diffraction element is small, displacement of the diffraction element and the complex prism has a great influence on the servo signals. The displacement occurs due to (i) change over time and (ii) temperature change.

Further, consider a case where the distance from the hologram element 109 to the light receiving element 110 is insufficient to be approximately 1 mm on the basis of the optical path length in the air, and where each of the $+1^{st}$ order diffraction light beams and each of the $-1^{st}$ order diffraction light beams are separated from each other by approximately 0.8 mm. In this case, the diffraction angle is approximately 18 deg. A grating pitch for realizing such a diffraction angle is approximately 1.4 μm in the case of a 405 nm wavelength blue optical system. It is difficult to manufacture such a hologram element 109.

Further, in order to attain the high-speed reproduction of the RF signal, the $+1^{st}$ order diffraction light beams and the $-1^{st}$ order diffraction light beams are used for the different purposes in the conventional technique. The light receiving sections exclusive for the $-1^{st}$ order diffraction light beams are used to detect the signal requiring the high-speed response. However, the diffraction light beams are affected by wavelength fluctuation and common difference, so that each of the light receiving sections needs to be designed to be large. Such restriction in the areas of the light receiving sections limits the high-speed reproduction of the RF signal.

In view of this, consider a case of arranging the optical integrated unit of the conventional technique such that both non-diffraction light beams (0 order diffraction light beams) and diffraction light beams ($1^{st}$ order diffraction light beams) are detected for the sake of detecting the RF signal in accordance with the non-diffraction light beams. In this case, the diffraction angle needs to be designed to be 35 deg such that each of the 0 order diffraction light beams and each of the $1^{st}$ order diffraction light beams are separated from each other by approximately 0.8 mm. A grating pitch for realizing such a diffraction angle is 0.7 μm in the case of the 405 nm wavelength blue optical system. It is very difficult to manufacture such a hologram element 109.

The present invention is made in light of the foregoing problem, and its object is to provide (i) an optical integrated unit, in which influences of change over time and temperature change are reduced as much as possible by increasing the size of a beam diameter of a light beam incidenting on a diffraction element, and by which manufacturing of the diffraction element is made easy by lengthening an optical path length from the diffraction element to a light receiving element so as to reduce a diffraction angle (so as to increase a grating pitch), and in which high-speed responsiveness (high-speed reproduction carried out by rotating an optical disk at high speed) is realized by detecting an RF signal with the use of non-diffraction light beams obtained by the diffraction element; and (ii) an optical pickup device including the optical integrated unit.

DISCLOSURE OF INVENTION

To achieve the object, an optical integrated unit of the present invention includes: a light source for emitting a light beam; light guiding means, having a function surface that allows passage of the light beam and that reflects returning light, which is the light beam reflected by an optical information recording medium, and guiding the returning light in a direction different from a direction toward the light source; a light receiving element for receiving the returning light guided by the light guiding means; and diffraction means, which diffracts the light beam and the returning light and is provided in a position where the diffraction means crosses with an optical axis of the light beam and where the light beam having passed through the function surface enters. Specifically, it is preferable that the function surface be a polarized light beam splitter surface.

According to the above structure, the light beam having passed through the light guiding means enters the diffraction means, and the returning light having been diffracted by the diffraction means and having passed through the light guiding means enters the light receiving element.

Specifically, the light beam emitted from the light source passes through the light guiding means, and then enters the diffraction means. Therefore, the light path length that the light beam travels from the light source to the diffraction means becomes long.

The light path length becomes long as such, so that the beam diameter of the light beam entering the diffraction means becomes larger as compared with a case where the light guiding means is not provided between the light source and the diffraction means.

This makes it possible to reduce an influence over detection of a servo signal even when change over time and temperature change causes displacement of the diffraction means and the light guiding means, with the result that good servo signal detection can be realized.

In the meanwhile, the light receiving element receives the returning light having been diffracted and having passed through the light guiding means. In other words, the returning light passes through the diffraction means, then enters the light guiding means, and finally enters the light receiving element. With this, the light path length that the returning light travels until it is received by the light receiving element becomes long.

On this account, even when the diffraction means is set to have a small diffraction angle, the beams of the diffracted light (returning light) are separated well on the light receiving element.

Further, it is preferable to arrange the optical integrated unit according to the present invention such that: the diffraction means is a polarized light diffraction element, which diffracts polarized light having a predetermined polarization plane, and which never diffracts polarized light having a polarization plane perpendicular to the predetermined polarization plane but allows passage of the polarized light. Specifically, it is preferable to arrange the optical integrated unit according to the present invention such that: the diffraction means is a polarized light diffraction element including a first hologram region and a second hologram region, each of which diffracts polarized light having a predetermined polarization plane, and each of which never diffracts polarized light having a polarization plane perpendicular to the predetermined polarization plane but allows passage of the polarized light, and the first hologram region and the second hologram region are so provided as to cross with the optical axis of the light beam, and are provided such that the polarization plane of the polarized light to be diffracted by the first hologram region is perpendicular to the polarization plane of the polarized light to be diffracted by the second hologram region.

This makes it possible to diffract the light beam and the returning light.

Each of the first hologram region and the second hologram region is provided with a grating. The grating diffracts the polarized light, having the polarization plane, of the light (polarized light) having entered each of the hologram regions. Here, an angle at which the light is diffracted is determined by the size of a pitch of the grating.

The first hologram region and the second hologram region are so provided as to cross with the optical axis of the light beam, and are provided such that the polarization plane of the polarized light to be diffracted by the first hologram region is perpendicular to the polarization plane of the polarized light to be diffracted by the second hologram region. Therefore, the polarized light diffracted by the first hologram region passes through the second hologram region without being diffracted, whereas the polarized light diffracted by the second hologram region passes through the first hologram region without being diffracted.

In this way, the diffraction means having such a structure diffracts the light beam and the returning light.

Note that the wording "diffracted light" in the present specification encompasses both (i) diffraction light having a diffraction angle and (ii) non-diffraction light (0 order diffraction light) having no diffraction angle, unless otherwise noted.

Further, it is preferable to arrange the optical integrated unit according to the present invention such that: the first hologram region divides the returning light into non-diffraction light and diffraction light.

As described above, in the optical integrated unit according to the present invention, the optical light path that the diffracted returning light travels until it is received by the light receiving element is long. Therefore, even when the returning light is diffracted into the non-diffraction light and the diffraction light, the non-diffraction light and the diffraction light are sufficiently separated from each other on the light receiving element.

In other words, in the optical integrated unit according to the present invention, even in cases where the diffraction light and the non-diffraction light are not sufficiently separated from each other in the vicinity of the first hologram region, an interval between the diffraction light and the non-diffraction light becomes wider as they travel such a long optical path, with the result that the diffraction light and the non-diffraction light are separated well from each other on the light receiving element.

Further, it is preferable to arrange the optical integrated unit according to the present invention such that: the second hologram region divides the light beam into three beams.

This makes it possible to detect a tracking error signal in accordance with the three-beam method, or the like.

Further, it is preferable to arrange the optical integrated unit according to the present invention such that: the light receiving element has (i) a light receiving section for receiving the diffraction light, and (ii) a light receiving section for receiving the non-diffraction light.

As described above, in the optical integrated unit according to the present invention, the optical light path that the diffracted returning light (the diffraction light and the non-diffraction light) travels until it is received by the light receiving element is long. Therefore, even when the non-diffraction light and the diffraction light are not sufficiently separated from each other in the vicinity of the first hologram region, the non-diffraction light and the diffraction light are sufficiently separated from each other on the light receiving element.

The light receiving element has the light receiving section for receiving the non-diffraction light, so that it is possible to use the non-diffraction light for detection of high-speed signals.

Specifically, it is possible to use the non-diffraction light for detection of high-speed signals such as an RF signal, a TES signal to be detected in accordance with a DPD method, and the like. Meanwhile, the diffraction light can be used for detection of a servo signal.

If the high-speed signals are detected with the use of the diffraction light, for example, the light receiving section for receiving the diffraction light needs to be large in consideration of fluctuation of the position of the light collected on the light receiving element 12, which fluctuation is caused due to influences of wavelength fluctuation and common difference. Such restriction in the area of the light receiving section is a factor of inhibiting high-speed reproduction of the RF signal. However, the optical integrated unit according to the present invention is free from such restriction in the area of the light receiving section, so that it is possible to realize excellent high-speed reproduction of the RF signal.

Further, because the optical path length is secured to be long, the diffraction light and the non-diffraction light are sufficiently separated from each other even when the diffraction means has a small diffraction angle. Therefore, even when each of the first hologram region and the second hologram region has a large grating pitch, the diffraction light and the non-diffraction light can be separated sufficiently.

In other words, it is allowed to form such first and second hologram regions that respectively have large grating pitches. This makes it possible to manufacture the diffraction means (the first hologram region and the second hologram region) with ease.

Further, it is preferable to arrange the optical integrated unit according to the present invention such that: the light guiding means has a reflecting surface for reflecting the returning light reflected by the function surface.

This makes it possible to reflect the diffracted returning light in a desired direction, with the result that the optical path length becomes further longer.

It is preferable to arrange the optical integrated unit according to the present invention such that: the light source is a semiconductor laser contained in a hermetically sealed package.

With this, the light source is not exposed to outside air. This makes it difficult for properties thereof to be deteriorated.

Further, it is preferable to arrange the optical integrated unit according to the present invention such that: a position of the light source is adjustable with respect to the light receiving element and the light guiding means.

With this, the respective positions of the light source and the light receiving element are accurately determined. Therefore, even in cases where the semiconductor laser contained in the package is used for the light source, the returning light surely enters the light receiving element. This allows (i) minimization of the area of the light receiving section for receiving the non-diffraction light and (ii) excellent detection of the high-speed signals.

Further, it is preferable that the optical integrated unit further include a ¼ wavelength plate, provided on a side of the diffraction means, which side is opposite to a side on which the light guiding means is provided.

With this, when the linearly polarized light, which is the light beam emitted from the light source, passes through the ¼ wavelength plate, the linearly polarized light is converted into circularly polarized light and is irradiated onto the optical information recording medium. This makes it difficult for the light to be influenced by double refraction of a substrate of the optical information recording medium upon generation of the RF signal or the like. Further, the returning light, the light reflected by the optical information recording medium, is linearly polarized light whose polarization plane is orthogonal to that of the linearly polarized light coming from the light source, so that it is possible to increase utilization efficiency of the returning light that is going to enter and be diffracted by the diffraction means and that are going to be reflected by the function surface.

Further, it is possible to restrain unnecessary interference between the light beam and the returning light.

It is preferable that the optical integrated unit according to the present invention further include: a ½ wavelength plate, provided between the light source and the function surface so as to cross with the optical axis of the light beam.

This allows increase of freedom in layout of components such as the light source.

For example, consider a case where the function surface (polarized light beam splitter surface) is caused to have such a property as to allow passage of a light beam whose polarization plane is that of the P polarized light. In this case, a layout of the light source is limited such that the light source emits the light beam whose polarization plane is that of the P polarized light. In view of this, the ½ wavelength plate is so provided between the light source and the function surface as to cross with the optical axis of the light beam, with the result that a light source for emitting a light beam other than the P polarized light beam, i.e., an S polarized light beam is usable for the light source and light utilization efficiency is never reduced. That is, freedom in the layout of the light source is increased, with the result that a direction of light intensity distribution of the light source can be changed. This increases freedom in a layout of a direction in which an intensity distribution correcting element (not shown) is installed in the light path extending from the light source to the collimator lens, if the intensity distribution correcting element is provided.

Further, an optical pickup device according to the present invention can be provided with the optical integrated unit arranged as described above.

This allows realization of downsizing and weight saving of the optical pickup device according to the present invention.

Additional objects, features, and strengths of the present invention will be made clear by the description below. Further, the advantages of the present invention will be evident from the following explanation in reference to the drawings.

BRIEF DESCRIPTION OF DRAWINGS

FIG. 3 is a diagram schematically illustrating a hologram pattern of a first polarization hologram element used in each optical integrated unit of embodiments according to the present invention.

FIG. 4 is a diagram illustrating a hologram pattern of a second hologram element used in each optical integrated unit of the embodiments according to the present invention.

FIG. 7 is a diagram illustrating another structure of the optical integrated unit of Embodiment 1 according to the present invention.

BEST MODE FOR CARRYING OUT THE INVENTION

Embodiment 1

The following explains an embodiment of the present invention with reference to FIG. 1 through FIG. 6.

Explained in the present embodiment is a case where an optical integrated unit of the present invention is provided in an optical pickup device provided in an optical information recording/reproducing device for carrying out optical information recording/reproducing with respect to an optical disk (optical information recording medium).

Figure 1:
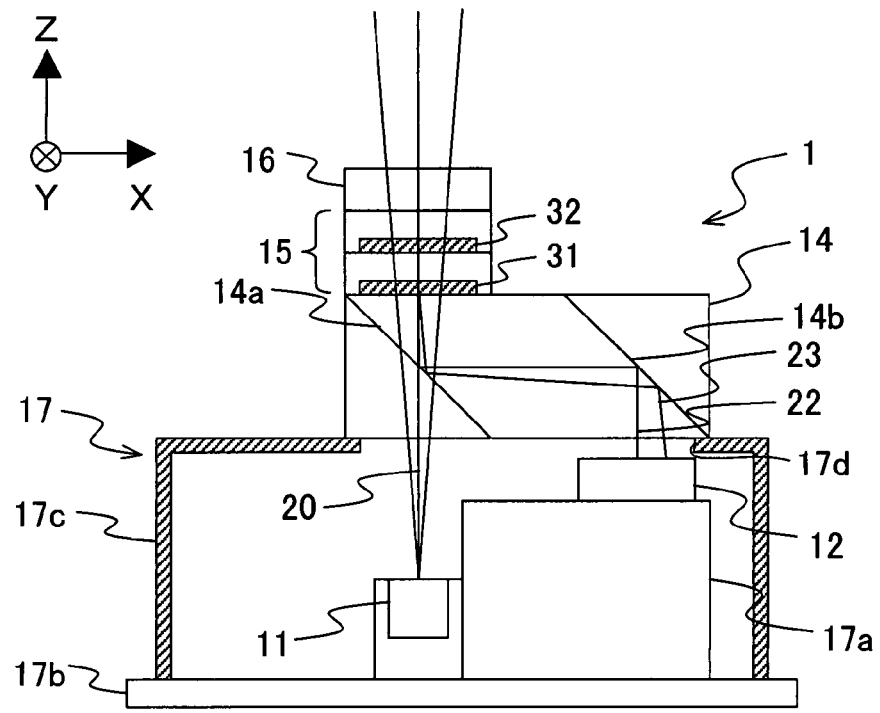
FIG. 1(a) is a diagram illustrating a structure of an optical integrated unit of Embodiment 1 according to the present invention.
FIG. 1(b) is a top view illustrating the optical integrated unit shown in FIG. 1(a).
Figure 1:
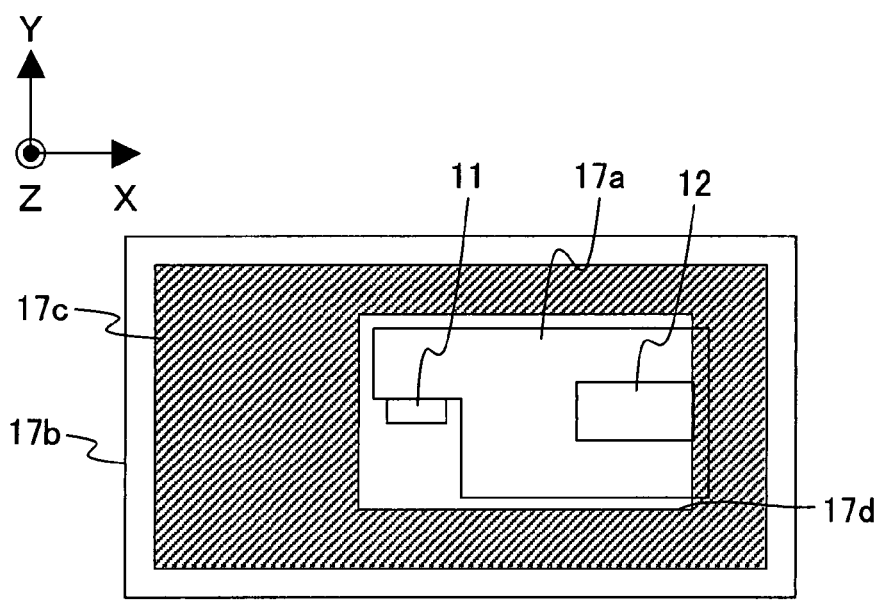
Figure 2:
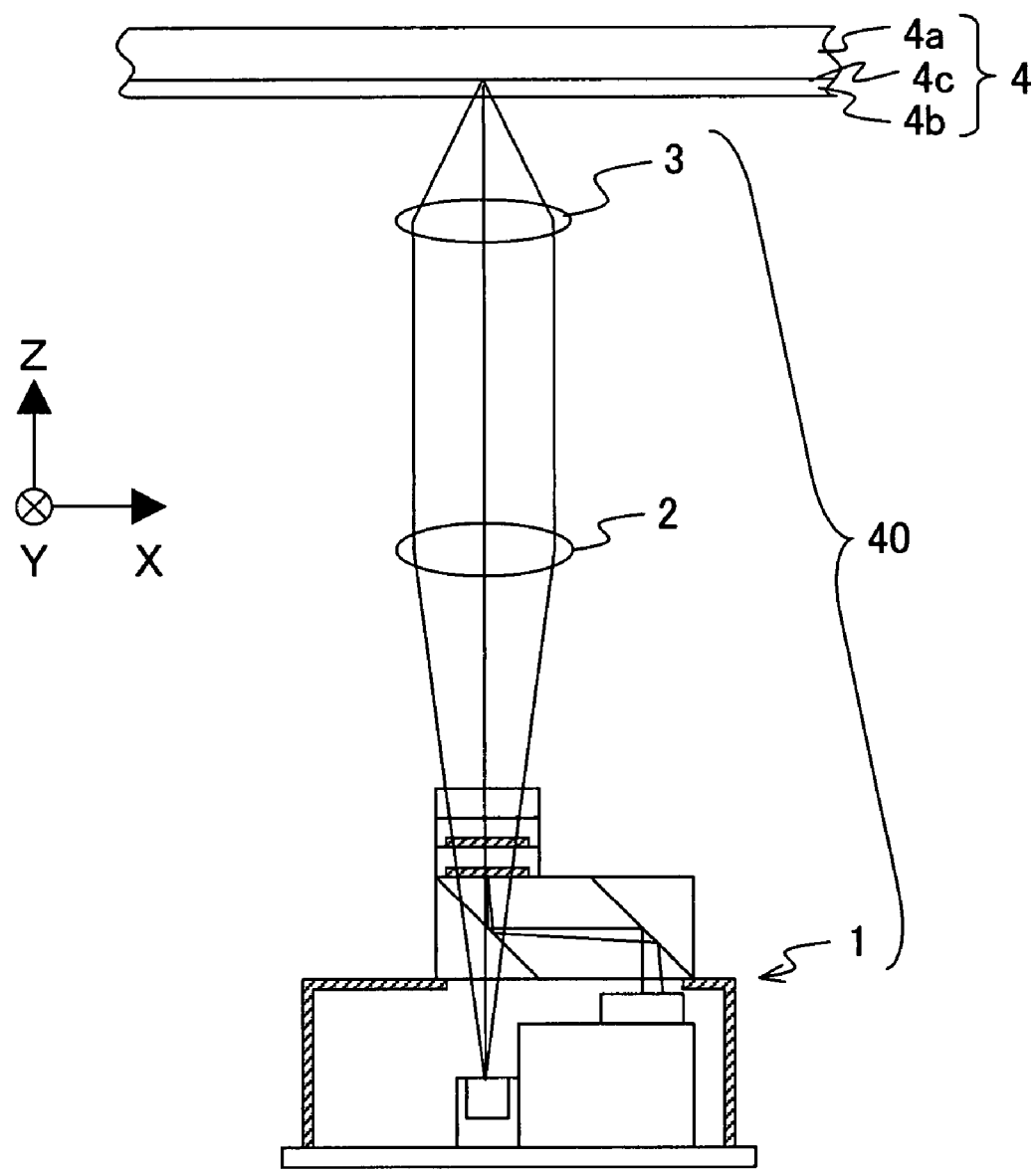
FIG. 2 is a diagram schematically illustrating a structure of an optical pickup device using the optical integrated unit shown in FIG. 1(a) and FIG. 1(b).

FIG. 2 is a diagram schematically illustrating a structure of an optical pickup device 40 using the optical integrated unit of the present embodiment.

The optical pickup device 40 shown in FIG. 2 includes the optical integrated unit 1, a collimator lens 2, and an objective lens 3.

In FIG. 2, a light beam emitted from a light source provided in the optical integrated unit 1 is caused to be parallel light by the collimator lens 2. Then, the parallel light passes through the objective lens 3, with the result that the parallel light is collected on an optical disk 4. The light is reflected by the optical disk 4 to be "returning light", and the returning light passes through the objective lens 3 and the collimator lens 2. Then, the returning light is received by a light receiving element provided in the optical integrated unit 1.

The optical disk 4 is made up of a substrate 4a, a cover layer 4b through which light beams pass, and a recording layer 4c provided between the substrate 4a and the cover layer 4b. The objective lens 3 is driven by an objective lens driving mechanism (not shown) in the focus direction (z axis direction) and the tracking direction (x direction) such that a collected light spot tracks predetermined positions of the recording layer 4c even when the optical disk 4 has surface runout and eccentricity.

The present embodiment assumes that the optical integrated unit 1 has a light source for emitting light having a short wavelength of approximately 405 nm, and that the objective lens 3 is a high NA objective lens having an NA of approximately 0.85. Note that the present invention is not limited to this, but an optical integrated unit having such a short wavelength light source and a high NA objective lens allows high density recording/reproducing.

FIG. 1(a) and FIG. 1(b) are diagrams each illustrating a structure of the optical integrated unit 1 shown in FIG. 2. FIG. 1(a) is a side view of the optical integrated unit 1 when viewed in the y axis direction with respect to the illustrated optical axis (z axis).

As shown in FIG. 1(a), the optical integrated unit 1 includes a semiconductor laser (light source) 11, a light receiving element 12, a polarized light beam splitter 14 (light guiding means), a polarized light diffraction element (diffraction means) 15, a ¼ wavelength plate 16, and a package 17.

The package 17 is made up of a stem 17a, a base 17b, and a cap 17c. The cap 17c has a window section 17d via which the light beam passes. In the package 17, the semiconductor laser 11 and the light receiving element 12 are provided. FIG. 1(b) is a top view illustrating the package 17 when viewed in the direction of the optical axis (z axis) shown in FIG. 1(a) (i.e., viewed from the side in which the window section 17d of the cap 17c is provided), and shows how the semiconductor laser 11 and the light receiving element 12 are provided in the package 17.

For simplicity, FIG. 1(b) does not illustrate the polarized light beam splitter 14, the polarized light diffraction element 15, and the ¼ wavelength plate 16.

As shown in FIG. 1(b), the light receiving element 12 is provided on the stem 17a, and the semiconductor laser 11 is so provided as to meet a lateral side of the stem 17a. For securing an optical path of the light beam to be emitted from the semiconductor laser 11 and an optical path of the returning light to be received by the light receiving element 12, the semiconductor laser 11 and the light receiving element 12 are provided such that a light beam emitting section of the semiconductor laser 11 and light receiving sections of the light receiving element 12 are positioned within a region corresponding to the window section 17d formed in the cap 17c.

The following explains how the constituent members are disposed, with reference to FIG. 1(a). The polarized light beam splitter 14 has a surface via which the light beam 20 emitted from the semiconductor laser 11 enters, and this surface is hereinafter referred to as "light beam entering surface" of the polarized light beam splitter 14 for convenience of description. Likewise, the polarized light beam splitter 14 has a surface via which the returning light enters, and this surface is hereinafter referred to as "returning light entering surface" for convenience of description. On the other hand, the polarized light diffraction element 15 has a surface via which the light beam 20 emitted from the semiconductor laser 11 enters, and this surface is hereinafter referred to as "light beam entering surface" of the polarized light diffraction element 15. Likewise, the polarized light diffraction element 15 has a surface via which the returning light enters, and this surface is hereinafter referred to as "returning light entering surface" of the polarized light diffraction element 15.

As shown in FIG. 1(a), the polarized light beam splitter 14 is provided on the package 17. Specifically, the polarized light beam splitter 14 is provided thereon such that the light beam entering surface of the polarized light beam splitter 14 covers the window section 17d.

The polarized light diffraction element 15 is provided such that the light beam entering surface thereof meets the returning light entering surface of the polarized light beam splitter 14, and is provided so as to cross with the optical axis of the light beam emitted from the semiconductor laser 11.

As described above, the semiconductor laser 11 emits the light beam 20 having a wavelength λ of 405 nm. In the present embodiment, the light beam 20 is linearly polarized light (P polarized light) whose polarization plane is in the x axis direction with respect to the illustrated optical axis (z axis). The light beam 20 emitted from the semiconductor laser 11 enters the polarized light beam splitter 14.

The polarized light beam splitter 14 has a polarized light beam splitter (PBS) surface (function surface) 14a and a reflecting mirror (reflecting surface) 14b.

The PBS surface 14a in the present embodiment has such a property as to allow passage of linearly polarized light (P polarized light) whose polarization plane is in the x direction with respect to the illustrated optical axis (z axis), but as to reflect linearly polarized light (S polarized light) whose polarization plane is perpendicular to the polarization plane of the P polarized light, i.e., reflect linearly polarized light whose polarization plane is in the y direction with respect to the illustrated optical axis (z axis). However, the present invention is not limited to this, and the above property can be changed. Specifically, it can be arranged such that a part of the P polarized light is reflected as described in Embodiment 3 below.

The PBS surface 14a is so positioned as to cross with the light beam emitted from the semiconductor laser 11 and having P polarized light, and therefore the light beam 20 passes therethrough. The reflecting mirror 14b is positioned in parallel with the PBS surface 14a.

The size of the polarized light beam splitter 14 is not particularly limited as long as the polarized light beam splitter 14 makes it possible that: the light beam 20 emitted from the semiconductor laser 11 passes through the PBS surface 14a, and the returning light reflected by the optical information recording medium is reflected by the PBS surface 14a and the returning light thus reflected is further reflected by the reflecting mirror 14b such that the returning light is received by the light receiving element 12. However, it is preferable that the polarized light beam splitter 14 be sufficiently larger than the window section 17d formed in the cap 17c of the package 17. When the polarized light beam splitter 14 is sufficiently larger than the window section of the cap 17c, the polarized light beam splitter 14 can be adhered and fixed to the cap 17c, thereby sealing the package 17. As a result, the semiconductor laser 11 and the light receiving element 12 are not exposed to outside air. This makes it difficult for properties of the semiconductor laser 11 and the light receiving element 12 to be deteriorated.

The light beam 20 (P polarized light) enters the PBS surface 14a, and passes therethrough as it is. Then, the light beam 20 having passed through the PBS surface 14a enters the polarized light diffraction element 15.

Note that the beam splitter of the optical integrated unit according to the present invention is not limited to the polarized light beam splitter 14. The beam splitter may be any structure that (i) allows passage of the light beam 20 emitted from the semiconductor laser 11, (ii) changes the optical path of the returning light, reflected by the optical information recording medium, by guiding the returning light in a direction different from the direction toward the semiconductor laser 11, and (iii) allows the light receiving element 12 to receive the returning light, as described above. Apart from the above polarized light beam splitter, it is possible to use a beam splitter whose function surface 14a is a half mirror surface.

The following fully explains the polarized light diffraction element 15. As shown in FIG. 1(a), the polarized light diffraction element 15 is made up of a first polarization hologram element 31 (second hologram region) and a second polarization hologram element 32 (first hologram region).

Each of the first polarization hologram element 31 and the second polarization hologram element 32 are so positioned as to cross with the optical axis of the light beam 20. The first polarization hologram element 31 is provided between the semiconductor laser 11 and the second polarization hologram element 32.

The first polarization hologram element 31 diffracts P polarized light but allows S polarized light to pass therethrough. On the other hand, the second polarization hologram element 32 diffracts S polarized light but allows P polarized light to pass therethrough. The diffracting of the polarized light is done by a groove structure (grating) formed in each of the polarization hologram elements. A diffraction angle is determined by a pitch of the grating. Hereinafter, the pitch is referred to as "grating pitch".

Formed in the first polarization hologram element 31 is a hologram pattern for generating three beams to be used for detection of a tracking error signal (TES).

That is, the light beam 20, the P polarized light, having passed through the PBS surface 14a enters the first polarization hologram element 31 and is diffracted therein, with the result that the light beam 20 is changed to be the three beams (a main beam and two sub beams) to be used for the detection of the tracking error signal (TES). Note that the hologram pattern of the first polarization hologram element 31 will be explained later in detail. As a method for detecting the TES with the use of the three beams, the three-beam method, the differential push-pull (DPP) method, the phase shift DPP method, and the like can be used.

The second polarization hologram element 32 diffracts S polarized light of the received light, but allows P polarized light thereof to pass therethrough as it is. Specifically, the second polarization hologram element 32 diffracts the received S polarized light into 0 order diffraction light beams (non-diffraction light) and $+1^{st}$ order diffraction light beams (diffraction light). However, the present invention is not limited to such diffraction, and it is possible to arbitrarily set how the received light is diffracted. Specifically, the second polarization hologram element 32 described in Embodiment 5 below diffracts received S polarized light into 0 order diffraction light beams (non-diffraction light) and $\pm 1^{st}$ order diffraction light beams.

That is, the P polarized light beams 20 having passed through the first polarization hologram element 31 enter the second polarization hologram element 32, and pass therethrough as they are. Then, the P polarized light beams 20 having passed through the second polarization hologram element 32 enter the ¼ wavelength plate 16. Note that the hologram pattern of the first polarization hologram element 31 will be explained later in detail.

The ¼ wavelength plate 16 is capable of receiving linearly polarized light, and converting the linearly polarized light into circularly polarized light. Therefore, the P polarized light beams 20 (linearly polarized light beams) having entered the ¼ wavelength plate 16 are converted into circularly polarized light beams. Then, the circularly polarized light beams go out of the optical integrated unit 1.

The circularly polarized light beams emitted from the optical integrated unit 1 are caused to be the parallel light by the collimator lens 2, and the parallel light passes through the objective lens 3, with the result that the light is collected on the optical disk 4. The light thus collected is reflected by the optical disk 4 to be returning light, passes through the objective lens 3 and the collimator lens 2, and enters the ¼ wavelength plate 16 of the optical integrated unit 1.

The returning light thus having entered the ¼ wavelength plate 16 of the optical integrated unit 1 is circularly polarized light, and therefore is converted by the ¼ wavelength plate 16 into linearly polarized light (S polarized light) whose polarization plane is in the y axis direction with respect to the illustrated optical axis (z axis). Then, the S polarization returning light enters the second polarization hologram element 32.

The S polarization returning light thus having entered the second polarization hologram element 32 is diffracted into the 0 order diffraction light beams (non-diffraction light) and the +1$^{st}$ order diffraction light beams (diffraction light) and they go out therefrom as described above. The S polarization returning light beams (0 order diffraction light beams and +1$^{st}$ order diffraction light beams) enter the first polarization hologram element 31 and pass therethrough as they are. Then, the S polarization returning light beams enter the polarized light beam splitter 14, and are reflected by the PBS surface 14a. The S polarization returning light beams thus reflected are further reflected by the reflecting mirror 14b, with the result that the S polarization returning light beams go out of the polarized light beam splitter 14. The S polarization returning light beams thus having gone out of the polarized light beam splitter 14 are received by the light receiving element 12. Note that the pattern of the light receiving sections of the light receiving element 12 will be described later.

In the present invention, the light source for emitting light having a short wavelength of approximately 405 nm, and (ii) the objective lens having a high NA of approximately 0.85 are provided. Moreover, the distance from the semiconductor laser 11 to the polarized light diffraction element 15 (specifically, the first polarization hologram element 31) is approximately 5 mm on the basis of optical path length in the air. Moreover, the distance from the polarized light diffraction element 15 (specifically, the second polarization hologram element 32) to the light receiving element 12 (optical path length) is approximately 5 mm.

However, the present invention is not limited to these values. In the case where the light source for emitting light having a short wavelength of approximately 405 nm and the objective lens 3 having a high NA of approximately 0.85 are provided, it is preferable that the distance from the semiconductor laser 11 to the polarized light diffraction element 15 (specifically, the first polarization hologram element 31) be long as much as possible, in view of properties of the optical integrated unit 1. A reason why this is preferable is because the effective diameter of the light beam becomes larger on the first polarization hologram element 31 as the distance is longer. However, the downsizing of the optical system needs to be taken into consideration. Hence, it is preferable that the distance fall within a range from 3 mm to 7 mm on the basis of optical path length in the air, and it is the most suitable that the distance be approximately 5 mm. Further, the light receiving element 12 needs to be designed such that the light receiving element 12 is positioned in the vicinity of the focal point of each of the beams of the non-diffraction light. Accordingly, a distance (optical path length) from the polarized light diffraction element 15 (specifically, the second polarization hologram element 32) to the light receiving element 12 is substantially as long as the distance from the semiconductor laser 11 to the polarized light diffraction element 15 (specifically, the first polarization hologram element 31).

Explained next is the hologram pattern formed in the first polarization hologram element 31, with reference to FIG. 3.

Note that the grating pitch in the first polarization hologram element 31 is designed such that the beams of the three types are sufficiently separated from one another on the light receiving element 12.

In the present embodiment, the distance between the semiconductor laser 11 and the first polarization hologram element 31 is set to be approximately 5 mm on the basis of optical path length in the air, and an interval between the main and sub beams is set to be approximately 150 μm on the light receiving element 12. Further, an interval between the main and sub beams is set to be approximately 16 μm on the optical disk 4. In the case where the interval between the main and sub beams is set to be approximately 150 μm on the light receiving element 12 and the interval between the main and sub beams is set to be approximately 16 μm on the optical disk 4, it is preferable that the grating pitch be approximately 14 μm in the present embodiment.

The present invention is not limited to these values. It is preferable that the interval between the main and sub beams on the light receiving element 12 be as wide as possible in view of signal properties for the sake of reducing signal crosstalk among the light receiving sections; however, the downsizing of the optical system needs to be taken into consideration, so that the optical integrated unit 1 is designed such that the interval falls within a range from 100 μm, which is minimally required length, to 200 μm, preferably, is approximately 150 μm. On the other hand, it is preferable that the interval between the main and sub beams on the optical disk 4 be as narrow as possible because an offset of the tracking error signal caused due to an effect of an assembly error is reduced; however, the interval is determined by determining the interval between the main and sub beams on the light receiving element 12. For example, consider a case where the light source 11 emits light having a wavelength of approximately 405 nm, the objective lens 3 has a focal distance of approximately 1.2 mm, the collimator lens 2 has a focal distance of approximately 11 mm, and the interval between the main and sub beams is set to fall within the range of 100 μm to 200 μm on the light receiving element 12. In this case, the interval between the main and sub beams on the optical disk 4 accordingly falls within the range from 11 μm to 22 μm, and the grating pitch is accordingly so designed as to be in the range of 20 μm to 10 μm. Therefore, in the case where it is impossible to narrow the interval between the main and sub beams on the optical disk 4, it is preferable to adopt the phase shift DPP method as a method for detecting the tracking error signal. The phase shift DPP method has such a feature as to allow for smaller offset of the tracking error signal caused due to the effect of the assembly error, as compared with the three-beam method and the DPP method.

FIG. 3 is a diagram schematically illustrating the hologram pattern formed in the first polarization hologram element 31. The hologram pattern may be a regular and linear grating for detecting the tracking error signal (TES) in accordance with the 3-beam method or the differential push-pull method (DPP) method; however, the explanation herein assumes a case where the phase shift DPP method disclosed in Patent citation 2 (Japanese Unexamined Patent Publication Tokukai 2001-250250 (published on Sep. 14, 2001)) is adopted.

See FIG. 3. The hologram pattern of the first polarization hologram element 31 is made up of two regions: a region 31a and a region 31b. The regions 31a and 31b have cycle structures whose phases are different from each other by 180°. With such cycle structures, the amplitude of a push-pull signal to be generated from the sub beams becomes substantially 0. This makes it possible to cancel the offset occurring due to objective lens shift and disk tilt. As the light beam 20 is registered with the regions 31a and 31b of the first polarization hologram element 31 more precisely, a better offset cancel property can be obtained. Further, as the light beam 20 has a larger effective diameter, it is possible to reduce an influence occurring when the light beam 20 and the region 31a are displaced from each other and the light beam 20 and the region 31b are displaced from each other due to change over time and temperature change. In other words, an influence over the servo signals to be detected later can be small.

In the optical system of the present embodiment, the collimator lens 2 shown in FIG. 2 has an effective NA of approximately 0.1 and the distance from the semiconductor laser 11 to the first polarization hologram element 31 is set at approximately 5 mm on the basis of optical path length in the air, so that the optical system can be designed such that the light beam 20 has an effective diameter φ of approximately 1 mm on the first polarization hologram element 31.

In other words, according to the structure of the present embodiment, the effective diameter of the optical beam 20 thereon is 2.5 times to 5 times larger than that in the conventional technique. In the conventional technique, the effective diameter φ falls within a range from 0.2 mm to 0.4 mm.

However, the present invention is not limited to the above value. It is preferable that the light beam 20 have an effective diameter φ of 0.6 mm to 1.4 mm on the first polarization hologram element 31 in the case of the optical system in which the collimator lens 2 has an effective NA of approximately 0.1.

Explained next is the hologram pattern formed in the second polarization hologram element 32, with reference to FIG. 4.

FIG. 4 is a diagram schematically illustrating the hologram pattern formed in the second polarization hologram element 32. The hologram pattern of the second polarization hologram element 32 is made up of three regions 32a, 32b, and 32c. Specifically, the region 32c is one semicircle region 32c obtained by dividing the hologram pattern in two with a boundary line 32x extending in the x axis direction corresponding to the tracking direction. The region 32a is an inner circumference region 32a and the region 32b is an outer circumference region 32b, each of which is obtained by dividing the other semicircle region with an arc-like boundary line. Note that the returning light is illustrated by a dot line in FIG. 4.

Among the regions of the second polarization hologram element 32, the region 32b has the smallest grating pitch (diffraction angle is the largest), the region 32c has the largest grating pitch (diffraction angle is the smallest), and the region 32a has a grating pitch whose value falls within a range between the values of the grating pitches of the regions 32b and 32c. From the $+1^{st}$ order diffraction light beams obtained by the regions 32a and 32b, a spherical aberration error signal (SAES) to be used for correction of spherical aberration can be detected. On the other hand, a focal error signal (FES) to be used for correction of focal point displacement can be detected in accordance with either (i) the single knife edge method using the $+1^{st}$ order diffraction light beams obtained by the region 32c, or (ii) the double knife edge method using the $+1^{st}$ order diffraction light beams obtained by the regions 32a, 32b, and 32c.

In the present invention, the 0 order diffraction light beams are used for detection of high-speed signals such as the RF signal and the TES signal that is to be detected in accordance with the DPD method. In this case, on the receiving element 12, each of the 0 order diffraction light beams needs to be separated from each of the $+1^{st}$ order diffraction light beams by an interval of approximately 0.5 mm to approximately 1.2 mm, more preferably, of approximately 0.7 mm to approximately 0.9 mm. In order to separate the 0 order diffraction light beam from the $+1^{st}$ order diffraction light beam by the above interval, it is preferable that the diffraction angle in the second hologram fall within a range from 5 deg to 10 deg and it is more preferable that the diffraction angle therein fall within a range from approximately 7 deg to approximately 9 deg.

For example, consider a case where the distance from the second hologram element 32 to the light receiving element 12 is approximately 5 mm on the basis of optical path length, and where it is determined that the 0 order diffraction light beam and the $+1^{st}$ order diffraction light beam are to be separated from each other by 0.8 mm on the light receiving element 12. In this case, the diffraction angle should be 8 deg or so. For attainment of such an diffraction angle, the grating formed in the second hologram element 32 should have a grating pitch of 2.8 μm or so in the case of a blue optical system for emitting light having a wavelength λ of 405 nm, which is the wavelength of the light beam of the present embodiment. This grating pitch is 4 times larger than the grating pitch, 0.7 μm, of the conventional technique. Therefore, the grating has a shape free from the aforementioned problem in manufacturing. Further, the diffraction angle is so small (approximately ¼ of the diffraction angle, 35 deg, of the conventional technique) that the light beam collection positions on the light receiving element 12 are less likely to be fluctuated.

Further, the first polarization hologram element 31 and the second polarization hologram element 32 can be manufactured in one piece after carrying out accurate positioning at a mask precision. Therefore, when the position adjustment of the second polarization hologram element 32 for the sake of obtaining a predetermined servo signal, the position adjustment of the first polarization hologram element 31 is done accordingly.

Explained next is a relation among the division pattern of the second polarization hologram element 32 and the pattern of the light receiving sections of the light receiving element 12, with reference to FIG. 5(a) and FIG. 5(b).

Figure 5A:
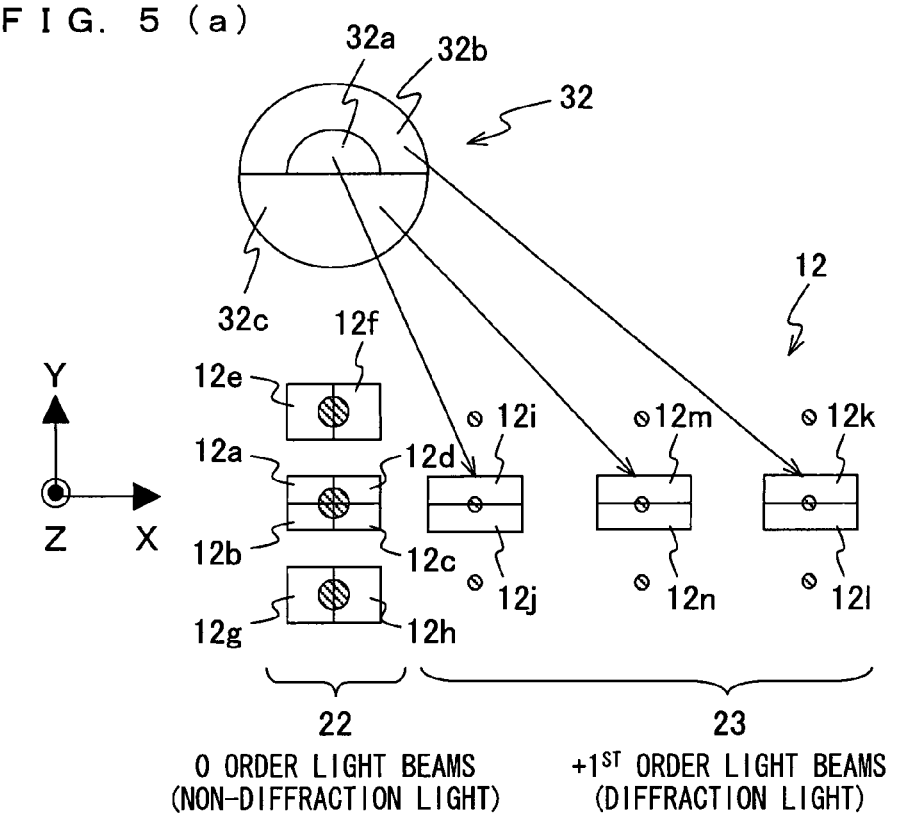
FIG. 5(a) is an explanatory diagram illustrating a pattern of light receiving sections of a light receiving element used in each optical integrated unit of Embodiments 1 through 5 according to the present invention, and illustrates respective reception states of light beams on the pattern of the light receiving sections in cases where no spherical aberration occurs.

FIG. 5(a) illustrates the light beams incidenting on the light receiving element 12 after being focused and collected on the recording layer 4c of the optical disk 4 (see FIG. 2) by adjusting the position of the collimator lens 2 in the optical axis direction such that the light beams collected by the objective lens 3 do not have spherical aberration with respect to the thickness of the cover layer 4b of the optical disk 4. FIG. 5(a) also shows a relation among the three regions 32a through 32c of the second polarization hologram element 32 and the traveling directions of the $+1^{st}$ order diffraction light beams. The explanation for the three regions 32a through 32c has been made above with reference to FIG. 4. In reality, the center of the second polarization hologram element 32 is so positioned as to correspond to the center of the light receiving sections 12a through 12d; however, for the purpose of explanation, the center of the second polarization hologram element 32 shown in FIG. 5(a) is dislocated in the y axis direction with respect to the optical axis (z axis).

As shown in FIG. 5(a), the light receiving element 12 is made up of fourteen light receiving sections 12a through 12n. The optical light beam 20, heading for the optical disk 4, is divided by the first polarization hologram element 31 into the three light beams (one main beam and two sub beams) 21. The three light beams 21 are so reflected by the optical disk 4 as to head for the optical integrated unit 1, and are divided by the second polarization hologram element 32 into the non-diffraction light beams (0 order diffraction light beams) 22 and the diffraction light beams ($+1^{st}$ order diffraction light beams) 23. Among the non-diffraction light beams (0 order diffraction light beams) 22 and the diffraction light beams ($\pm1^{st}$ order diffraction light beams), the light receiving sections provided in the light receiving element 12 receive light beams required for the detection of the RF signal and the servo signals.

Specifically, the light beams formed by the second polarization hologram element 32 are 12 light beams: three non-polarized light beams (0 order diffraction light beams) 22 and nine $+1^{st}$ order diffraction light beams 23. The optical integrated unit 1 is designed so that each of the non-diffraction light beams 22 of the light beams becomes large to such an extent that the TES detection can be carried out using the push-pull method. In the present embodiment, the light receiving element 12 is positioned in a slightly back side with respect to the light collection point of the non-diffraction light beams 22 such that each of the non-diffraction light beams (0 order diffraction light beams) 22 has a large diameter to some extent. Note that the present invention is not limited to this, and the light receiving element 12 may be positioned in a slightly forward side with respect to the light collection point of the non-diffraction light beams 22.

Thus, the light beam whose light beam diameter is large to some extent is collected in the boundary sections of the light receiving sections 12a through 12d. By adjusting outputs of the four light receiving sections (12a through 12d) such that the outputs are equal to one another, the positions of the non-diffraction light beams 22 and the position of the light receiving element 12 can be adjusted.

Figure 5B:
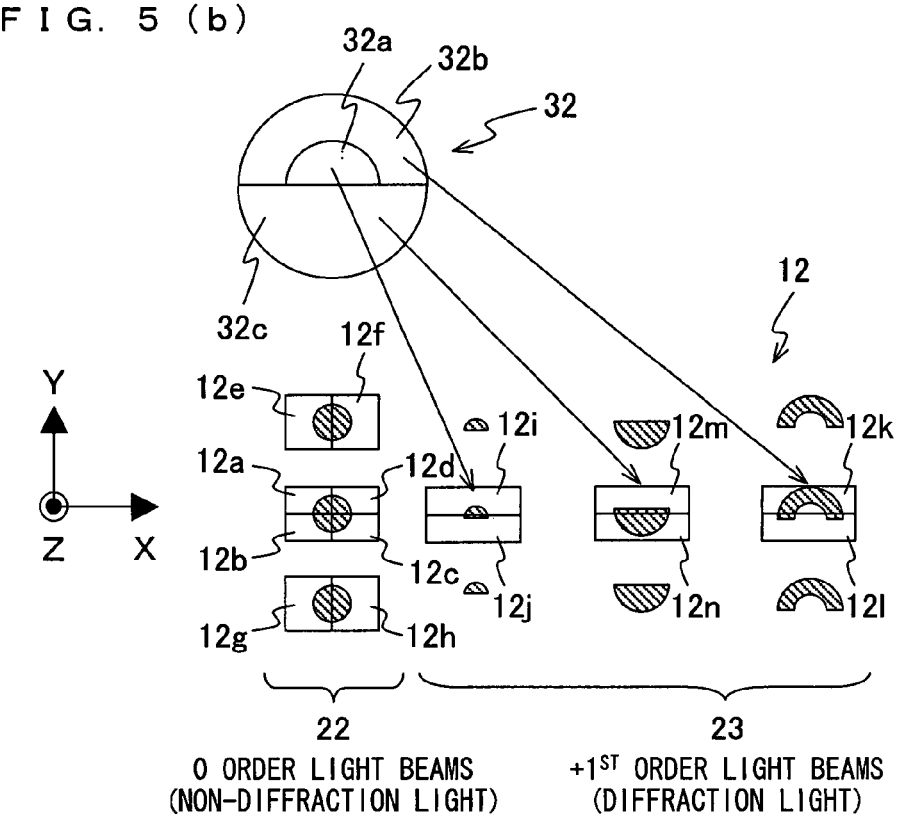
FIG. 5(b) is an explanatory diagram illustrating the pattern of the light receiving sections of the light receiving element used in each optical integrated unit of Embodiments 1 through 5 according to the present invention, and illustrates respective reception states of the light beams thereon in cases where an objective lens comes closer to an optical disk from a position at which the objective lens is positioned in the case of FIG. 5(a).
Figure 6:
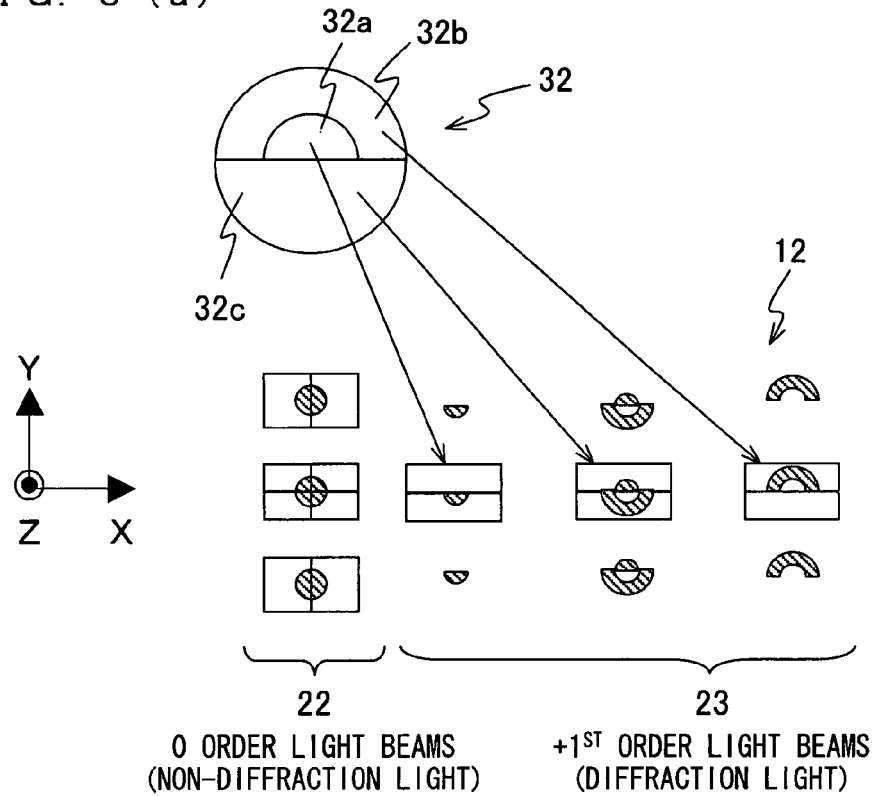
FIG. 6(a) is an explanatory diagram illustrating respective shapes of the light beams incidenting on the light receiving element in cases there is spherical aberration and the objective lens focuses on the optical disk.
FIG. 6(b) is an explanatory diagram illustrating respective shapes of the light beams incidenting on the light receiving element in cases there is spherical aberration and the objective lens focuses on the optical disk.
Figure 6:
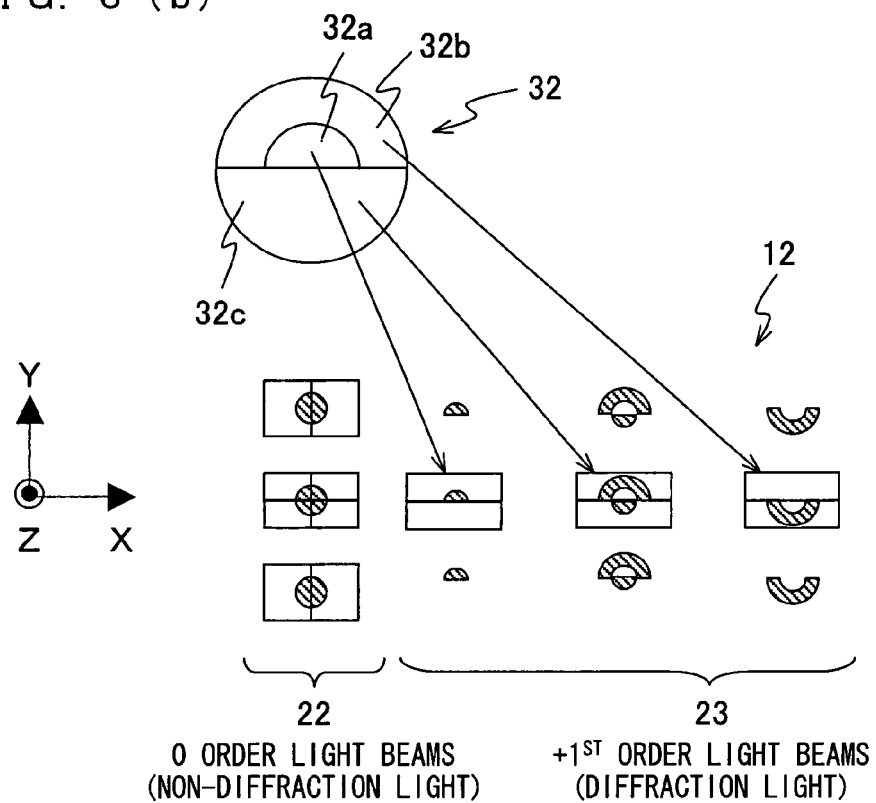

FIG. 5(b) illustrates the light beams incidenting on the light receiving element 12 in cases where the objective lens 3 shown in FIG. 2 comes closer to the optical disk 4 from a position at which the objective lens 3 is positioned in the case of FIG. 5(a). When the objective lens 3 comes closer to the optical disk 4, the respective beam diameters of the light beams become larger, but the light beams do not go off from the light receiving sections.

Explained next is an operation for generating the servo signals, with reference to FIG. 4, FIG. 5(a), and FIG. 5(b). Note that symbols Sa through Sn denote the output signals of the light receiving sections 12a through 12n, respectively.

The RF signal (RF) is detected with the use of the non-diffraction light beams. Therefore, the RF signal (RF) can be given by the following formula:

$$RF=Sa+Sb+Sc+Sd.$$

In accordance with the DPD method, the tracking error signal (TES1) is detected by carrying out phase comparison among Sa through Sd. Specifically, the following principle is used. That is, when the light beams collected by the objective lens 3 scan pit rows formed in the recording layer 4c of the optical disk 4, an intensity distribution pattern of the reflected beams is changed according to a positional relation between the pit rows and the light beams. Therefore, when the light beams scan the center of the bit rows, it is detected that (Sa+Sc) and (Sb+Sd) have the same phases; however, when the light beams scan a position displaced from the center of the pit rows, the direction of a phase difference between (Sa+Sc) and (Sb+Sd) is reversed according to a direction of the displacement. Therefore, by detecting the phase difference between (Sa+Sc) and (Sb+Sd), the tracking error signal can be obtained.

In the meanwhile, in accordance with the phase shift DPP method, the tracking error signal (TES 2) can be given by the following formula:

$$TES2=\{(Sa+Sb)-(Sc+Sd)\}-\alpha\{(Se-Sf)+(Sg-Sh)\}$$

where $\alpha$ is a coefficient set to be optimal for canceling the offset occurring due to the objective lens shift and the optical disk tilt.

The focus error signal (FES) is detected in accordance with the double knife edge method. That is, the FES can be given by the following formula:

$$FES=(Sm-Sn)-\{(Sk+Si)-(Sl+Sj)\}$$

As described above, the optical pickup device of the present embodiment includes (i) the optical integrated unit 1 in which the light source for emitting light having a short wavelength of approximately 405 nm, and (ii) the objective lens 3 having a high NA of 0.85, so that high density recording/reproduction can be carried out. Generally, inclusive of the present embodiment, for increasing recording density of an optical disk, laser light needs to have a short wavelength and an objective lens needs to have a large numerical aperture NA. For example, the use of an objective lens having a numerical aperture NA of 0.6 and laser light having a wavelength of 650 nm allows for realization of a large storage capacity in a DVD (Digital Versatile Disc) whose density is higher as compared with a CD (Compact Disc). Further, the use of an objective lens having a numeric aperture of 0.85 and laser light having a wavelength of 405 nm allows for realization of a further larger storage capacity in a BD (Blu-ray Disc). However, as the objective lens has a larger numeric aperture NA, the optical disk thus having a large storage capacity is influenced by aberration. This is a problem.

Spherical aberration occurs due to an error in a thickness t (hereinafter, referred to as "disk substrate thickness t") of a cover layer provided between a laser light incident surface and a recording layer of an optical disk, when the laser light is irradiated to the recording region of the optical disk. The disk substrate thickness t corresponds to a distance which the laser light travels in the optical disk until the laser light reaches the recording layer storing information. The spherical aberration increases in proportion to fourth root of the numeric aperture NA. In order to restrain such spherical aberration, it is effective to reduce dimensional tolerance of the disk substrate thickness t. For example, consider respective cases of the CD, the DVD, and a next generation high density optical disk. The disk substrate thickness t of the CD, which is recorded/reproduced with the use of (i) laser light having a wavelength of 780 nm and (ii) an objective lens having a numeric aperture NA of 0.45, has a dimensional tolerance of $\pm 100$ µm. The disk substrate thickness t of the DVD, which is recorded/reproduced with the use of (i) laser light having a wavelength of 650 nm and (ii) an objective lens having a numeric aperture NA of 0.6, has a dimensional tolerance of $\pm 30$ µm. The disk substrate thickness t of the next generation high density optical disk, which is recorded/reproduced with the use of (i) laser light having a wavelength of 405 nm and (ii) an objective lens having a numeric aperture NA of 0.85 as is the case with the present embodiment, has a dimensional tolerance of $\pm 3$ µm. Realizing a larger capacity in an optical disk accelerates a difficulty in precision of manufacturing such a disk.

However, the error in the disk substrate thickness t depends on an optical disk manufacturing method, so that it is very difficult to improve dimensional precision of the disk substrate thickness t. This is a problem. Moreover, the improvement of the dimensional precision of the disk substrate thickness t causes increase in cost of manufacturing the optical disk. This is disadvantageous. Therefore, an optical pickup device is required to have a function of correcting the spherical aberration occurring when reproducing the optical disk.

Generally, the correction of the spherical aberration is carried out by mechanically moving a lens such as a beam expander. In order to carry out the correction of the spherical aberration accurately and fast, it is necessary to detect a spherical aberration error signal, in accordance with which the correction of the spherical aberration is carried out.

Also in the present embodiment, for the correction of the spherical aberration occurring due to the error in the thickness of the cover layer 4b, the position of the collimator lens 2 is adjusted in the optical axis direction with the use of a collimator lens driving mechanism (not shown). Alternatively, a space between two lenses constituting a beam expander (not shown) provided between the collimator lens 2 and the objective lens 3 is adjusted with the use of a beam expander driving mechanism (not shown).

Various methods are proposed for the detection of the spherical aberration correction signal for use in controlling such driving mechanisms. For example, there is such a method that the spherical aberration error signal is detected in accordance with focal point positions of two light beams obtained by dividing returning light with the use of a hologram element. See Patent citation 3 (Japanese Unexamined Patent Publication Tokukai 2002-157771 (published on May 31, 2002).

In the present embodiment, the spherical aberration error signal (SAES) is detected in accordance with signals detected from the light beams respectively having passed through the inner circumference region 32a and the outer circumference region 32b. That is, the SAES is given by the following formula:

$$SAES=(Sk-Sl)-\beta(Si-Sj)$$

where β is a coefficient set to be optimal for canceling the offset of the SAES.

Each of FIG. 6(a) and FIG. 6(b) is an explanatory diagram illustrating respective shapes of the light beams incidenting on the light receiving element 12 in cases where the spherical aberration error has occurred, due to the influence of the error in the thickness of the cover layer 4b of the optical disk 4, in the light beams collected by the objective lens 3 focusing on the optical disk 4. The light beams having passed through the inner circumferential region 32a and shown in each of FIG. 6(a) and FIG. 6(b) are reverse to the light beams having passed through the outer circumferential region 3b and shown in each of FIG. 6(a) and FIG. 6(b), with respect to the division lines of the receiving sections. A direction in which the spherical aberration has occurred in the case of FIG. 6(a) is different from a direction in which the spherical aberration has occurred in the case of FIG. 6(b). The difference in the direction in which the spherical aberration has occurred refers to such a difference that the thickness of the cover layer 4b is thinner or thicker than a design value.

As described above, in the optical integrated unit 1, the light beam having passed through the polarized light beam splitter 14 enters the polarized light diffraction element 15 and the returning light beams having been diffracted by the polarized light diffraction element 15 and having passed through the polarized light beam splitter 14 is received by the light receiving element 12.

That is, the light beam 20 emitted from the light source passes through the polarized light beam splitter 14, and then enters the polarized light diffraction element 15 (the first hologram element 31), so that the optical path length that the light beam 20 travels from the light source to the first hologram element 31 becomes long.

Such a long optical path length makes it possible to increase the size of the beam diameter of the light beam 20 entering the first hologram element 31 as compared with a case where the polarized light beam splitter 14 is not provided between the semiconductor laser 11 and the first hologram element 31.

This allows reduction of the influence over the detection of the servo signals even in cases where the change over time and the temperature change cause the displacement of the diffracting means and the light guiding means, thereby realizing good servo signal detection.

Meanwhile, the light receiving element 12 receives the returning light beams having been diffracted by the polarized light diffraction element 15 (the second hologram element 32) and having passed through the polarized light beam splitter 14. That is, after passing through the second hologram element 32 and before entering the light receiving element 12, the returning light beams have passed through the polarized light beam splitter 14, so that the optical path length that the diffracted returning light beams travel until the returning light beams are received by the light receiving element 12 becomes long.

With this, the diffracted light beams (returning light) are separated well from one another on the light receiving element 12 even in cases where the polarized light diffraction element 15 (each of the first hologram element 31 and the second hologram element 32) is set to have a small diffraction angle.

Further, in the optical integrated unit 1, the polarized light diffraction element 15 has the first hologram element 31 and the second hologram element 32, each of which diffracts polarized light having a predetermined polarization plane and each of which allows passage of polarized light having a polarization plane perpendicular to the polarization plane of the polarized light to be diffracted. The first hologram element 31 and the second hologram element 32 are provided so as to cross with the optical axis of the light beam 20, and are provided such that the light to be diffracted by the first hologram element 31 has a polarization plane perpendicular to that of the light to be diffracted by the second hologram element 32.

With this, the polarized light diffracted by the first hologram region is never diffracted by the second hologram region and passes therethrough. In contrast, the polarized light diffracted by the second hologram region is never diffracted by the first hologram region and passes therethrough. In other words, the polarized light diffraction element is provided such that the light beam and the returning light can be diffracted individually.

Further, it is preferable to arrange the optical integrated unit according to the present invention such that the second hologram element 32 diffract the returning light into non-diffraction light beams and diffraction light beams.

The diffracted returning light beams travel a long optical path until they are received by the light receiving element of the optical integrated unit 1. Therefore, even in cases where the returning light beams are diffracted into the non-diffraction light beams and the diffraction light beams, the non-diffraction light beams and the diffraction light beams are sufficiently separated from one another on the light receiving element 12.

That is, even though the non-diffraction light beams and the diffraction light beams are not sufficiently separated from one another in the vicinity of the second hologram element 32, an interval between each of the non-diffraction light beams and each of the diffraction light beams becomes wider as the non-diffraction light beam and the diffraction light beam travel such a long optical path. As a result, the diffraction light beams and the non-diffraction light beams are separated well from one another on the light receiving element 12.

Further, it is preferable that the first hologram element 31 divide the light beam into three beams.

This makes it possible to detect the tracking error signal in accordance with the three-beam method or the like.

Further, the light receiving element 12 in the optical integrated unit 1 includes the light receiving sections for receiving the diffraction light beams and the light receiving sections for receiving the non-diffraction light beams.

As described above, the optical path length of the returning light beams (the diffraction light beams and the non-diffraction light beams) is long in the optical integrated unit 1. Therefore, even though the diffraction light beams and the non-diffraction light beams are not sufficiently separated from one another in the vicinity of the second hologram element 32, the diffraction light beams and the non-diffraction light beams are separated well from one another on the light receiving element 12.

The light receiving element 12 includes the light receiving sections for receiving the non-diffraction light beams, so that the non-diffraction light beams can be used for detection of high-speed signals.

Specifically, the non-diffraction light beams can be used for detection of high-speed signals such as the RF signal and the TES signal that is to be detected in accordance with the DPD method. On the other hand, the diffraction light beams can be used for detection of the servo signals.

If the high-speed signals are detected with the use of the diffraction light beams, for example, the light receiving sections for receiving the diffraction light beams need to be large in consideration of fluctuation of the positions of the light beams collected on the light receiving element 12, which fluctuation is caused due to influences of wavelength fluctuation and common difference. Such restriction in the area of the light receiving sections is a factor of inhibiting high-speed reproduction of the RF signal. However, the optical integrated unit 1 is free from such restriction in the area of the light receiving sections, so that it is possible to realize excellent high-speed reproduction of the RF signal.

Further, the optical path length is secured to be long, so that the diffraction light beams and the non-diffraction light beams are sufficiently separated from one another on the light receiving element 12 even in cases where the diffraction angle in the polarized light diffraction element 15 is small.

Thus, the grating pitch in each of the first hologram element 31 and the second hologram element 32 can be formed to be large. With this, the polarized light diffraction element 15 (the first hologram element 31 and the second hologram element 32) can be manufactured with ease.

Further, the polarized light beam splitter 14 of the optical integrated unit 1 further includes the reflecting mirror 14b, so that the diffracted returning light beams can be reflected in a desired direction. This makes the optical path length further longer.

Further, in the optical integrated unit 1, the semiconductor laser 11 is contained in the hermitically sealed package 17. Therefore, the semiconductor laser 11 is not exposed to outside air. This makes it difficult for the properties of the semiconductor laser 11 to be deteriorated.

Further, in the optical integrated unit 1, the position of the semiconductor laser 11 is adjustable with respect to the light receiving element 12 and the polarized light beam splitter 14, so that the respective positions of the semiconductor laser 11 and the light receiving element 12 are accurately determined. With this, even in cases where the semiconductor laser 11 contained in the package 11 is used, the returning light beams can be securely received by the light receiving element 12. This allows (i) minimization of the area of the light receiving sections for receiving the non-diffraction light beams can be minimized, and (ii) excellent detection of the high-speed signals.

Further, in the optical integrated unit 1, the polarized light diffraction element 15 has a side on which the polarized light beam splitter 14 is provided and has an opposite side on which the ¼ polarization wavelength plate 16 is provided. With this, when the linearly polarized light, which is obtained from the light beam emitted from the semiconductor laser 11, passes through the ¼ wavelength plate 16, the linearly polarized light is converted into circularly polarized light and is irradiated onto the optical disk 4. This makes it difficult for the light to be influenced by double refraction of the substrate 4a upon generation of the RF signal or the like. Further, the returning light, the light reflected by the optical disk 4, is linearly polarized light whose polarization plane is orthogonal to that of the linearly polarized light coming from the semiconductor laser 11, so that it is possible to increase utilization efficiency of the returning light that is going to enter and be diffracted by the polarized light diffraction element 15 and that is going to be reflected by the PBS surface 14a. Further, it is possible to restrain unnecessary interference between the light beam and the returning light.

Further, the optical pickup device 40 of the present embodiment includes the optical pickup unit 1 arranged as above, so that the optical pickup device 40 is small and has low weight.

Note that: the present embodiment explains such a structure that the three beams are generated by the first hologram element 31; however, the present invention is not limited to this. The present invention is applicable to an optical integrated unit using one beam for generation of the TES instead of the three beams.

Figure 12:
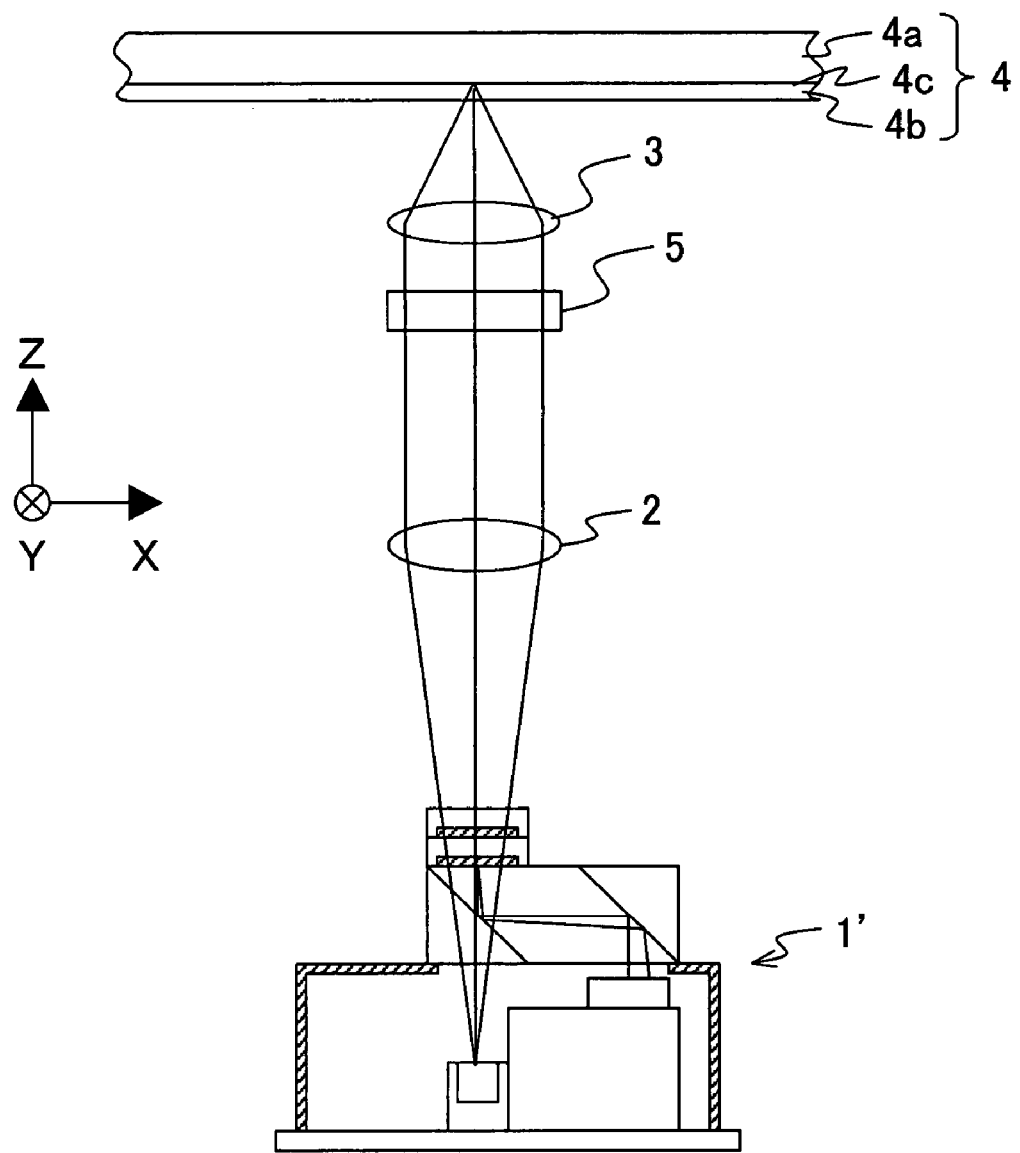
FIG. 12 is a diagram illustrating a structure of an optical pickup device including (i) an optical integrated unit obtained by removing a ¼ wavelength plate from the optical integrated unit of each of the embodiment of the present application, and (ii) a ¼ wavelength plate provided outside the optical integrated unit.
Figure 13:
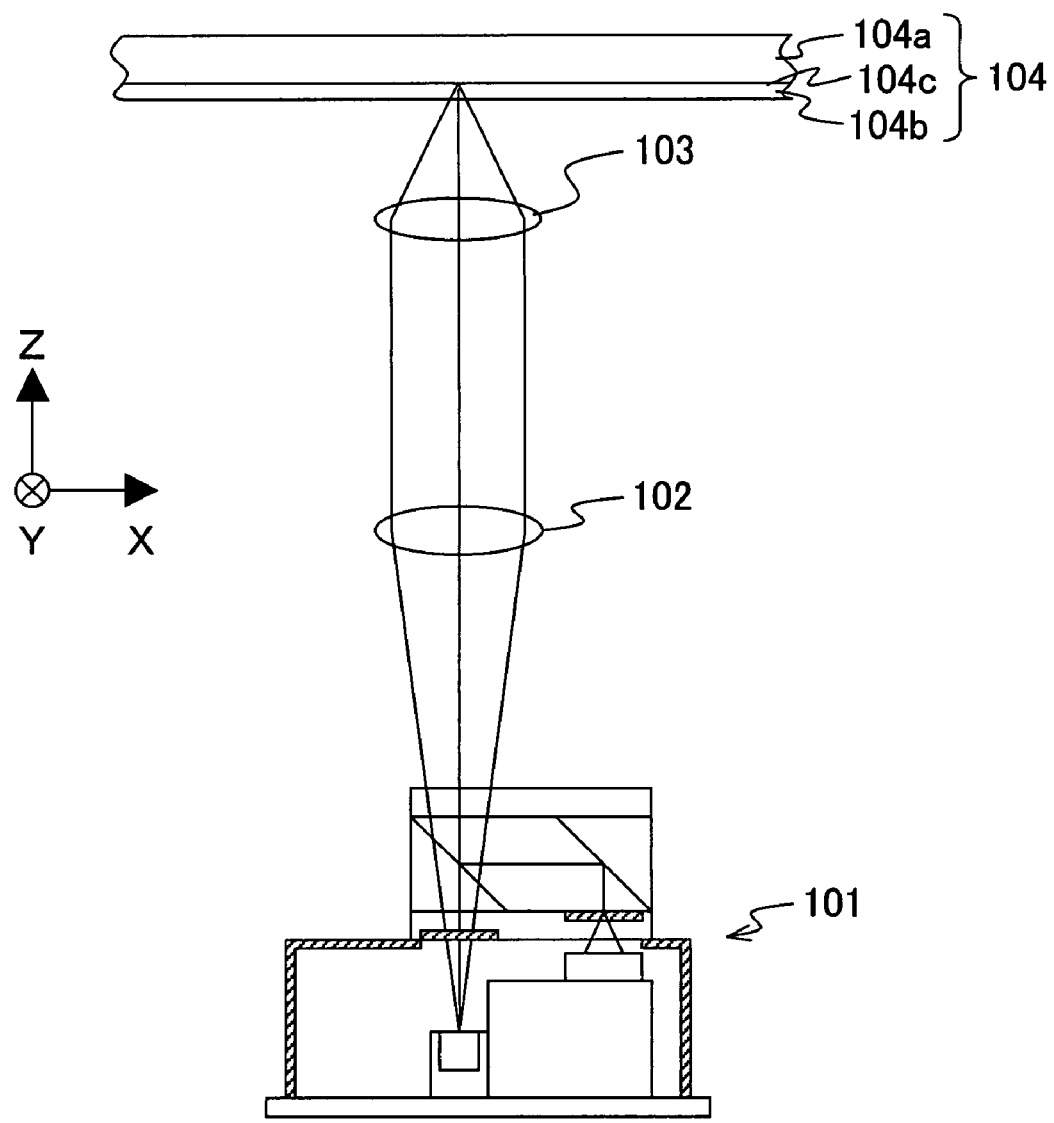
FIG. 13 is a diagram illustrating a structure of a conventional optical pickup device.
Figure 14:
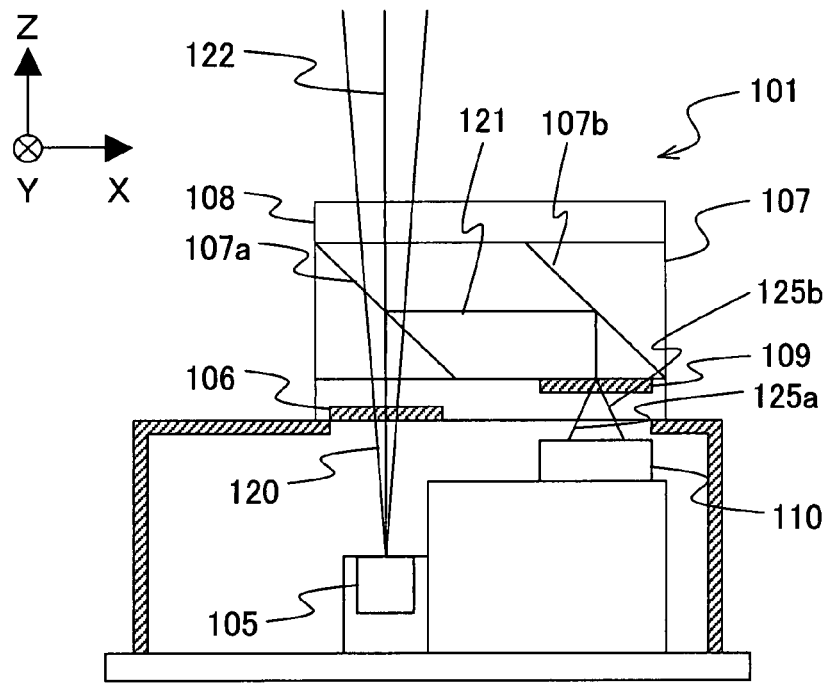
FIG. 14 is a diagram illustrating a structure of an optical integrated unit used in the conventional optical pickup device.
Figure 15:
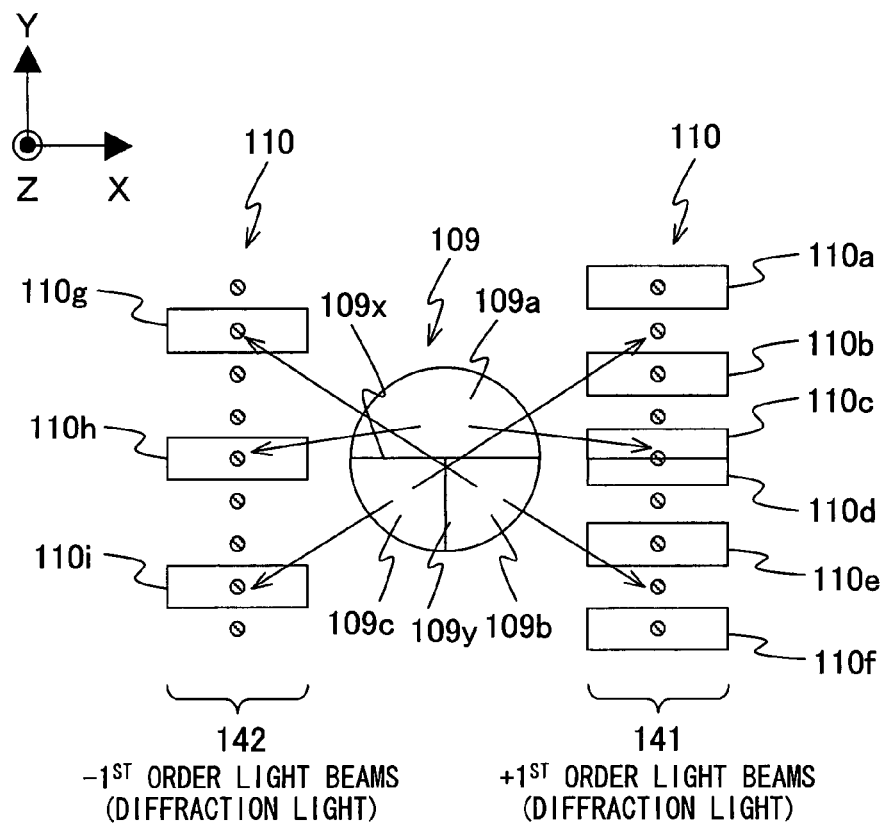
FIG. 15 is a diagram illustrating a hologram pattern of a hologram element provided in the optical integrated unit used in the conventional optical pickup device, and a pattern of light receiving sections of a light receiving element provided therein.

Note also that: the optical pickup device of the present invention can be so arranged as to include (i) an optical integrated unit 1' from which the ¼ wavelength plate 16 is removed, and (ii) an external ¼ wavelength plate 5 as shown in FIG. 12.

Note also that: in the present embodiment, the polarized light diffraction element 15 for diffracting the light beam and the returning light is provided on the side of the polarized light beam splitter 14, which side is opposite to the semiconductor laser 11 side. However, the present invention is not limited to this.

Specifically, the optical integrated unit of the present invention may be arranged such that a diffraction element 33 for generating three beams for use in detection of the tracking error signal is provided on the semiconductor laser 11 side of the polarized light beam splitter 14, as shown in FIG. 7. In cases where the three-beam method or the DPP method is used for the detection of the TES, the position of the diffraction element 33 does not need to be adjusted in the x axis direction and the y axis direction. The diffraction element 33 needs to be rotated and adjusted such that the track direction of the optical disk 4 coincides with the arranging direction of the three beams; however, the diffraction element 33 is rotated and adjusted by rotating the whole optical integrated unit 1 with respect to the optical axis. Thus, the diffraction element 33 does not need to be directly adjusted and can be fixed to the package 17. The returning light beams do not pass through the diffraction element 33 but only the light beam 20 passes therethrough, so that the diffraction element 33 does not need to have a polarization property. Therefore, a normal hologram element having no polarization property can be used for the diffraction element 33. Further, as shown in FIG. 7, the package 17 can be sealed by the diffraction element 33. This allows restraint of deterioration of properties of the semiconductor laser 11 and light receiving element 12.

Further, it is possible to express that the feature of the present invention as follows. That is, an optical integrated unit according to the present invention is an optical integrated unit integrated with a light source; light guiding means for guiding returning light, which comes from an optical information recording medium, in a direction different from a direction toward the light source; a polarized light diffraction element; and a light receiving element, wherein: the light source diffraction element is provided on a side of the light guiding means, which side faces the light source and the light receiving element.

In this case, it is possible to arrange the optical integrated unit such that the light guiding means is a polarized light beam splitter at least having two reflecting surfaces parallel to each other.

Embodiment 2

Another embodiment according to the present invention will be explained below with reference to FIG. 8(a) and FIG. 8(b). Explained in the present embodiment are differences from Embodiment 1. Therefore, for ease of explanation, materials having the equivalent functions as those explained in Embodiment 1 will be given the same reference symbols, and explanation thereof will be omitted here.

Figure 8:
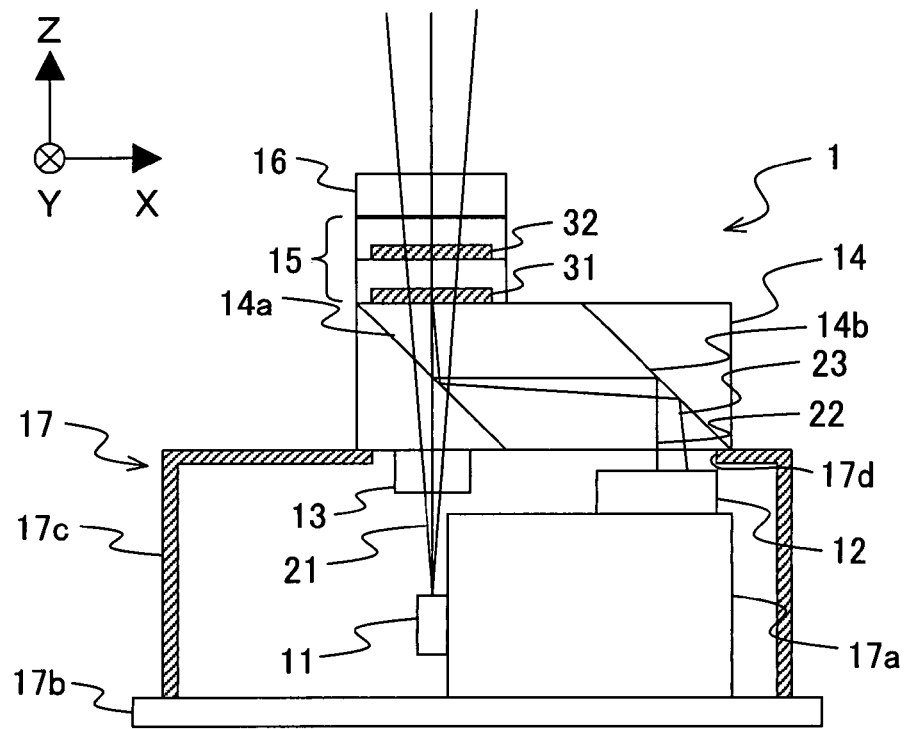
FIG. 8(a) is a diagram illustrating a structure of an optical integrated unit of Embodiment 2 according to the present invention.
FIG. 8(b) is a top view illustrating the optical integrated unit shown in FIG. 8(a).
Figure 8:
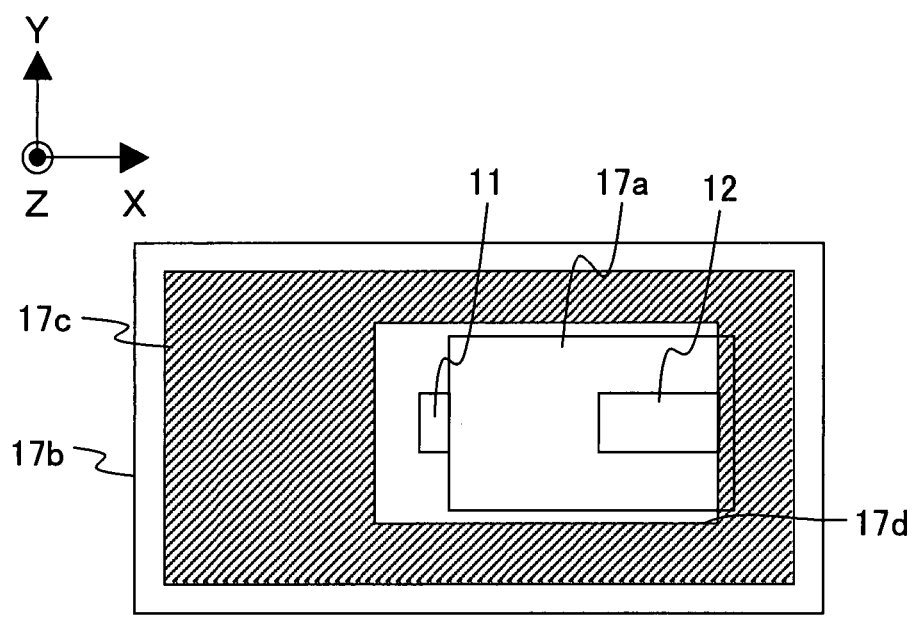

Each of FIG. 8(a) and FIG. 8(b) is a diagram illustrating a structure of an optical integrated unit of Embodiment 2 of the present invention. FIG. 8(a) is a side view of the optical integrated unit when viewed in the y axis direction with respect to the illustrated optical axis (z axis). FIG. 8(b) is a top view illustrating the package 17a when viewed in the direction of the optical axis (z axis) shown in FIG. 8(a) (i.e., viewed from the side in which the window section 17d of the cap 17c is provided), and shows how the semiconductor laser 11 and the light receiving element 12 are provided in the package 17.

In the optical integrated unit of the present embodiment, the semiconductor laser 11 is installed in a manner different from the manner in which the semiconductor laser 11 of Embodiment 1 is installed. Moreover, a ½ wavelength plate 13 is provided in the optical integrated unit of the present embodiment.

Specifically, in Embodiment 1, the semiconductor laser 11 shown in FIG. 2 emits the linearly polarized light (P polarized light) whose polarization plane is in the x axis direction with respect to the illustrated optical axis (z axis). On the other hand, in the present embodiment, the semiconductor laser 11 is so provided in the package 17 as to emit a linearly polarized light beam 21 (S polarized light) whose polarization plane is in the y axis direction with respect to the illustrated optical axis (z axis).

If such an S polarized light beam 21 whose polarization plane is in the y axis direction with respect to the illustrated optical axis (z axis) is emitted from the semiconductor laser 11 of the present embodiment and directly enters the polarized light beam splitter 14 of Embodiment 1, the light beam 21 is entirely reflected by the PBS surface 14a thereof, with the result that no light beam heads for the optical disk 4.

In view of this, in the present embodiment, the ½ wavelength plate 13 is provided in an optical path between the semiconductor laser 11 and the polarized light beam splitter 14, unlike the structure of Embodiment 1. The ½ wavelength plate 13 thus provided converts the light beam 21 into linearly polarized light (P polarized light) whose polarization plane is in the x axis direction with respect to the illustrated optical axis (z axis). This allows the light beam 21 to entirely pass through the PBS surface 14a of the polarized light beam splitter 14.

Because the ½ wavelength plate 13 is provided as such, the present invention is applicable to such a structure in which the semiconductor laser 11 emits a light beam other than a P polarized light beam, i.e., emits an S polarized light beam, while light utilization efficiency is never reduced.

Further, this allows increase of freedom in a layout of components such as the semiconductor laser 11 and an intensity distribution correcting element (not shown). Furthermore, this allows increase of freedom in designing for an RIM intensity of each of the light beams entering the objective lens 3.

Embodiment 3

Still another embodiment according to the present invention will be explained below with reference to FIG. 9(a) and FIG. 9(b). Explained in the present embodiment are differences from Embodiment 1. Therefore, for ease of explanation, materials having the equivalent functions as those explained in Embodiment 1 will be given the same reference symbols, and explanation thereof will be omitted here.

Figure 9:
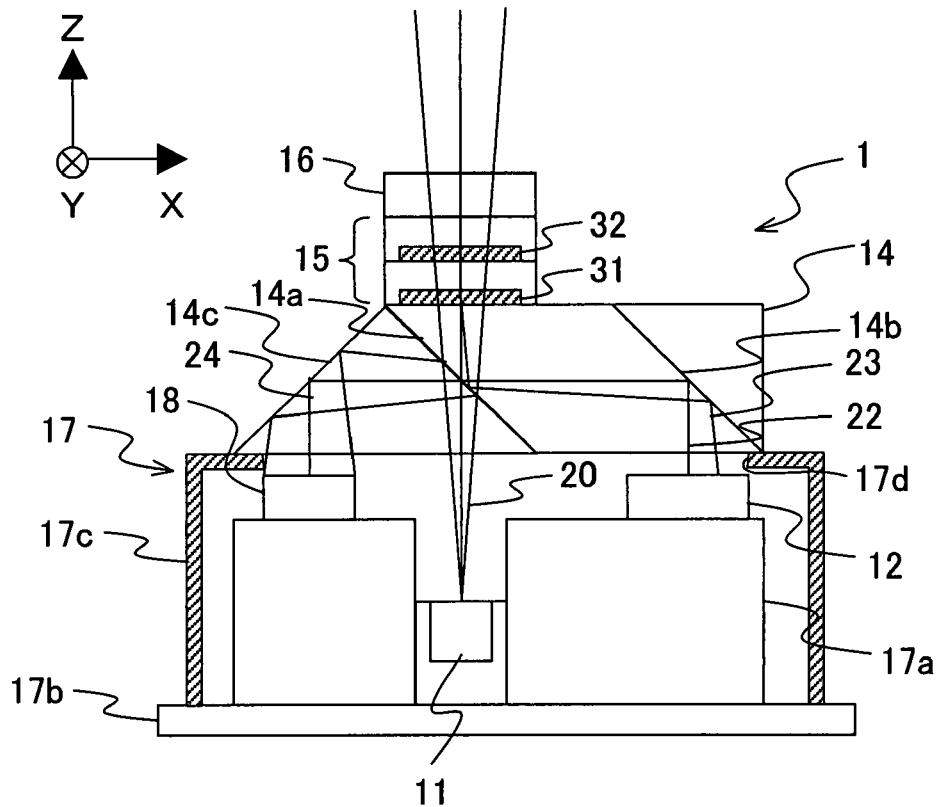
FIG. 9(a) is a diagram illustrating a structure of an optical integrated unit of Embodiment 3 of the present invention.
FIG. 9(b) is a top view illustrating the optical integrated unit shown in FIG. 9(a).
Figure 9:
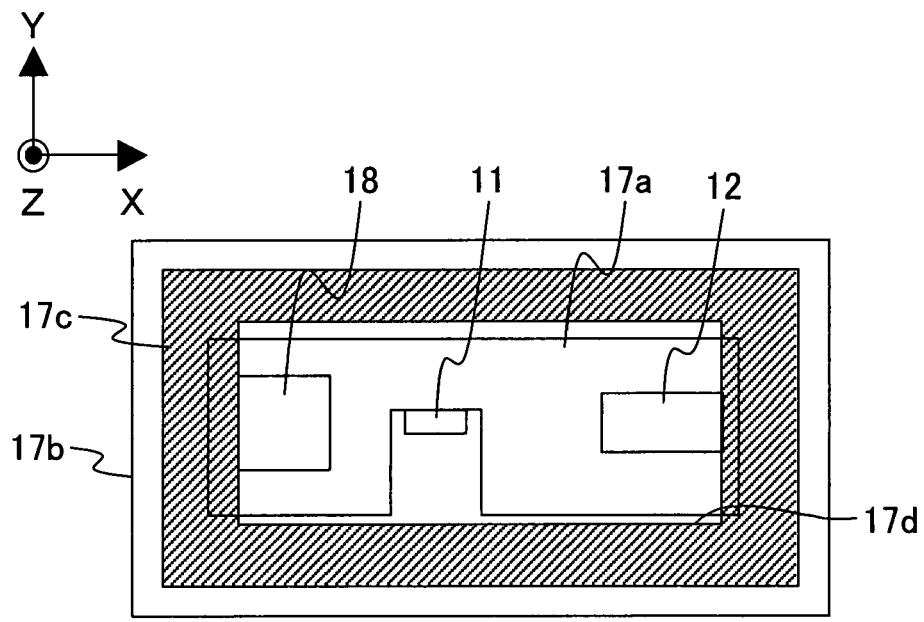

Each of FIG. 9(a) and FIG. 9(b) is a diagram illustrating a structure of an optical integrated unit of Embodiment 3 of the present invention. FIG. 9(a) is a side view of the optical integrated unit when viewed in the y axis direction with respect to the illustrated optical axis (z axis). FIG. 9(b) is a top view illustrating the package 17a when viewed in the direction of the optical axis (z axis) shown in FIG. 9(a) (i.e., viewed from the side in which the window section 17d of the cap 17c is provided), and shows how the semiconductor laser 11 and the light receiving element 12 are provided in the package 17.

The optical integrated unit of the present embodiment has a structure obtained by (i) adding a reflecting surface 14c in the polarized light beam splitter 14 of the optical integrated unit of Embodiment 1 and (ii) adding a light receiving element (APC purpose light receiving element) 18 in the package 17. The light receiving element 18 is provided for the purpose of APC (control over an amount of light going out from the objective lens).

This will be explained specifically as follows. In Embodiment 1, there is only one optical path in which the light beam 20 travels from the semiconductor laser 11 of the optical integrated unit 1 to the objective lens 3 via the PBS surface 14a of the polarized light beam splitter 14. In contrast, in the present embodiment, there are two optical paths: (i) the optical path in which a light beam 20 travels from the semiconductor laser 11 of the optical integrated unit 1 to the objective lens 3 via the PBS surface 14a of the polarized light beam splitter 14, and (ii) an optical path in which a light beam 20 is reflected by the PBS surface 14a and then enters the APC purpose light receiving element 18. In proportion to an amount of light emitted from the semiconductor laser 11, the amount of the light going out from the objective lens 3 and an amount of the light entering the APC purpose light receiving element 18 are changed. By using the light amount detected by the APC purpose light receiving element 18, it is possible to accurately control the amount of the light going out from the objective lens 3.

In order to secure the incoming light to the APC purpose light receiving element 18, the structure of the present embodiment is different from the structure of Embodiment 1 in the following point: (1) the PBS surface 14a has a property slightly changed from the property of the PBS surface 14a of Embodiment 1 so as to reflect a part of the P polarized light; or (2) either the semiconductor laser 11 is installed in such a manner that the semiconductor laser 11 of Embodiment 1 is rotated with respect to the optical axis, or a ½ wavelength plate (not shown) is provided between the semiconductor laser 11 and the polarized light beam splitter 14 for the sake of allowing a light beam having an S polarized light component to enter the PBS surface 14a.

With such a structure, even the APC purpose light receiving element 18 can be integrated with the optical integrated unit 1. This allows further downsizing of an optical pickup device.

Embodiment 4

Yet another embodiment according to the present invention will be explained below with reference to FIG. 10. Explained in the present embodiment are differences from Embodiment 1. Therefore, for ease of explanation, materials having the equivalent functions as those explained in Embodiment 1 will be given the same reference symbols, and explanation thereof will be omitted here.

Figure 10:
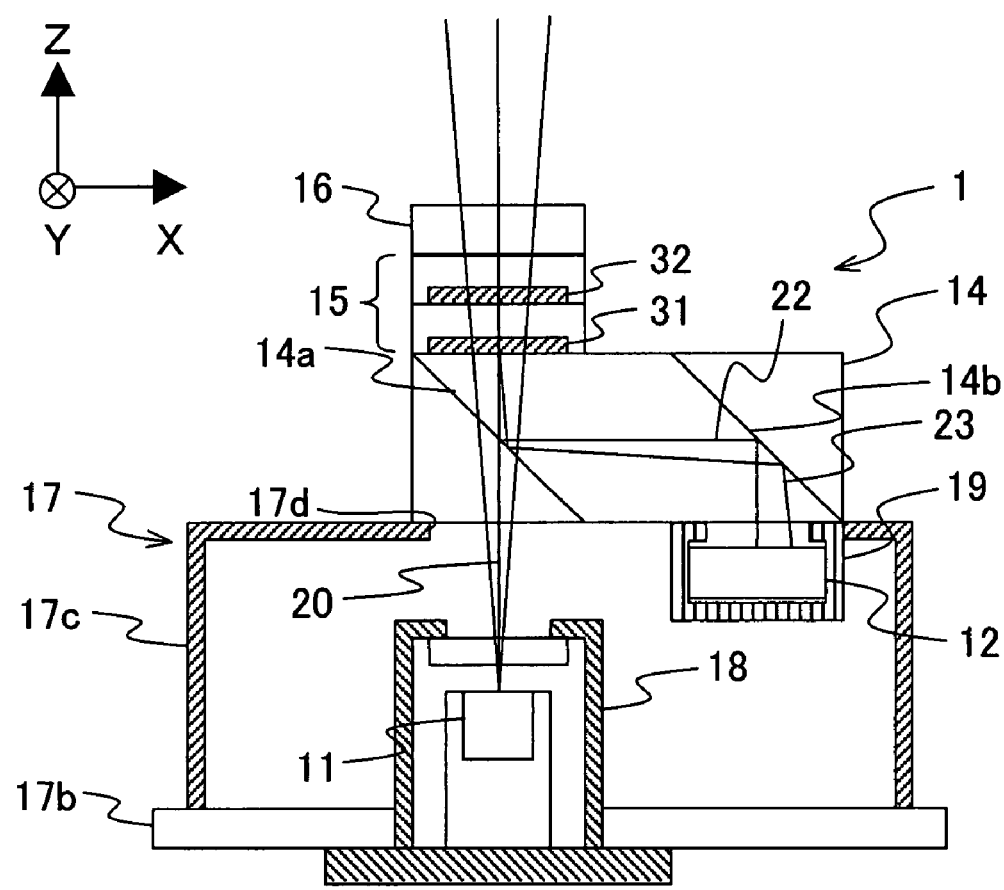
FIG. 10 is a diagram illustrating a structure of an optical integrated unit of Embodiment 4 of the present invention.

FIG. 10 illustrates a structure of an optical integrated unit 1 of Embodiment 4. The optical integrated unit of the present embodiment is different therefrom in respective structures of the semiconductor laser 11 and the light receiving element 12.

Specifically, in Embodiment 1, the semiconductor laser 11 and the light receiving element 12 are provided in the package 17 as they are. In contrast, in the present embodiment, the semiconductor laser 11 and the light receiving element 12 are contained in packages 18 and 19, individually. In other words, as shown in FIG. 10, the semiconductor laser 11 and the light receiving element 12 are contained in the packages 18 and 19 respectively, and the packages 18 and 19 thus individually containing the semiconductor laser 11 and the light receiving element 12 are integrated in the package 17 that is the same one as the package 17 of Embodiment 1.

This makes it possible to securely seal the semiconductor laser 11 and the light receiving element 12, so that property deterioration can be surely restrained.

Further, the package 17 does not need to be sealed, so that the polarized light beam splitter 14 does not need to be large enough to completely cover the window section 17d. This allows downsizing of the shape of the component, with the result that the integrated unit becomes small, has low weight, and can be made at low cost.

Further, the semiconductor laser 11 and the light receiving element 12 can be handled with ease. This makes it difficult for the semiconductor laser 11 and the light receiving element 12 to be broken due to a mistake in handling. Moreover, repairing becomes easy which needs to be done when the semiconductor laser 11 and the light receiving element 12 are broken.

Further, the position of the semiconductor laser 11 is adjustable with respect to the polarized light beam splitter 14 and the light receiving element 12. With this, an assembly error is absorbed such that the returning light securely enters the light receiving element 12.

Embodiment 5

Further another embodiment according to the present invention will be explained with reference to FIG. 11(a) and FIG. 11(b). Explained in the present embodiment are differences from Embodiment 1. Therefore, for ease of explanation, materials having the equivalent functions as those explained in Embodiment 1 will be given the same reference symbols, and explanation thereof will be omitted here.

The second polarization hologram element 32 of Embodiment 1 diffracts the received S polarized light into the 0 order diffraction light beams (non-diffraction light) and the $+1^{st}$ order diffraction light beams (diffraction light). In contrast, provided in the present embodiment is a second polarization hologram element 32 for diffracting received S polarized light into 0 order diffraction light beams (non-diffraction light) and $\pm 1^{st}$ order diffraction light beams (diffraction light).

Further, the light receiving element 12 of Embodiment 1 is provided with the pattern of the light receiving sections for receiving the 0 order diffraction light beams (non-diffraction light) and the $+1^{st}$ order diffraction light beams (diffraction light). In contrast, in the present embodiment, because the second polarization hologram element 32 diffracts the received S polarized light into the 0 order diffraction light beams (non-diffraction light) and $\pm 1^{st}$ order diffraction light beams (diffraction light), the light receiving element 12 of the present embodiment is provided with a pattern of light receiving sections for receiving the 0 order diffraction light beams (non-diffraction light), the $-1^{st}$ order diffraction light beams (diffraction light), and $+1^{st}$ order diffraction light beams (diffraction light).

Figure 11:
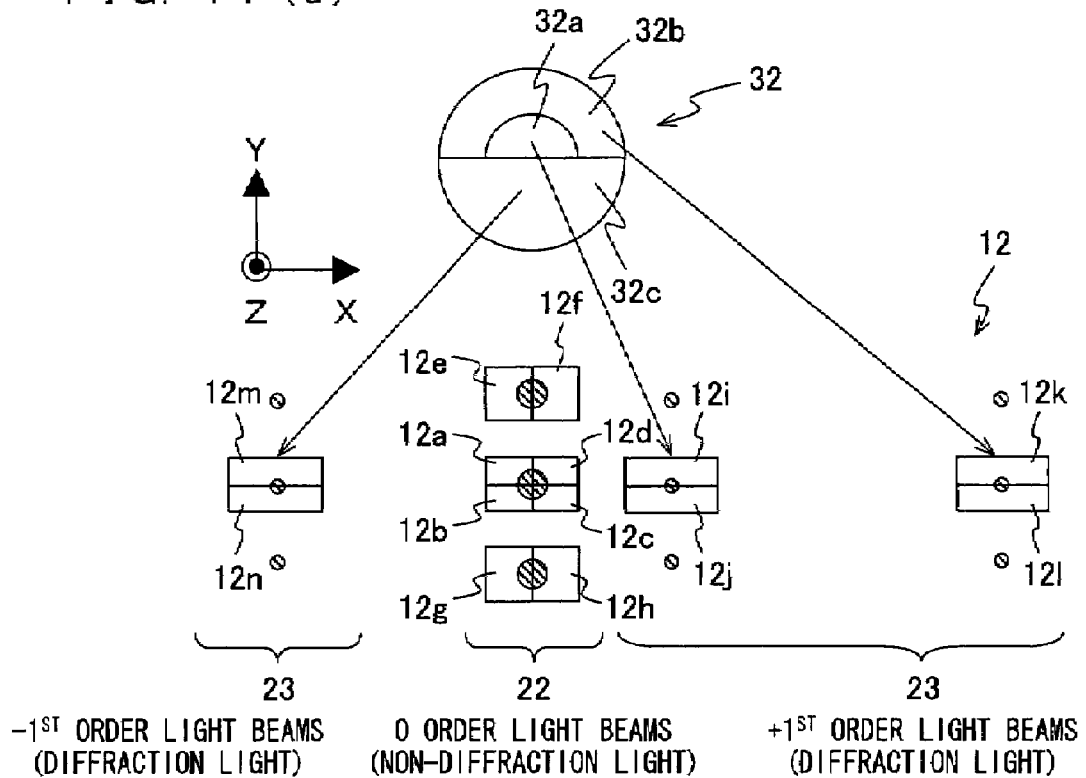
FIG. 11(a) is an explanatory diagram illustrating a pattern of light receiving sections of a light receiving element used in an optical integrated unit of Embodiment 5 according to the present invention, and illustrates respective reception states of light beams on the pattern of the light receiving sections in cases where no spherical aberration occurs.
FIG. 11(b) is an explanatory diagram illustrating the pattern of the light receiving sections of the light receiving element used in the optical integrated unit of Embodiment 5 according to the present invention, and illustrates respective reception states of the light beams thereon in cases where an objective lens comes closer to an optical disk from a position at which the objective lens is positioned in the case of FIG. 11(a).
Figure 11:
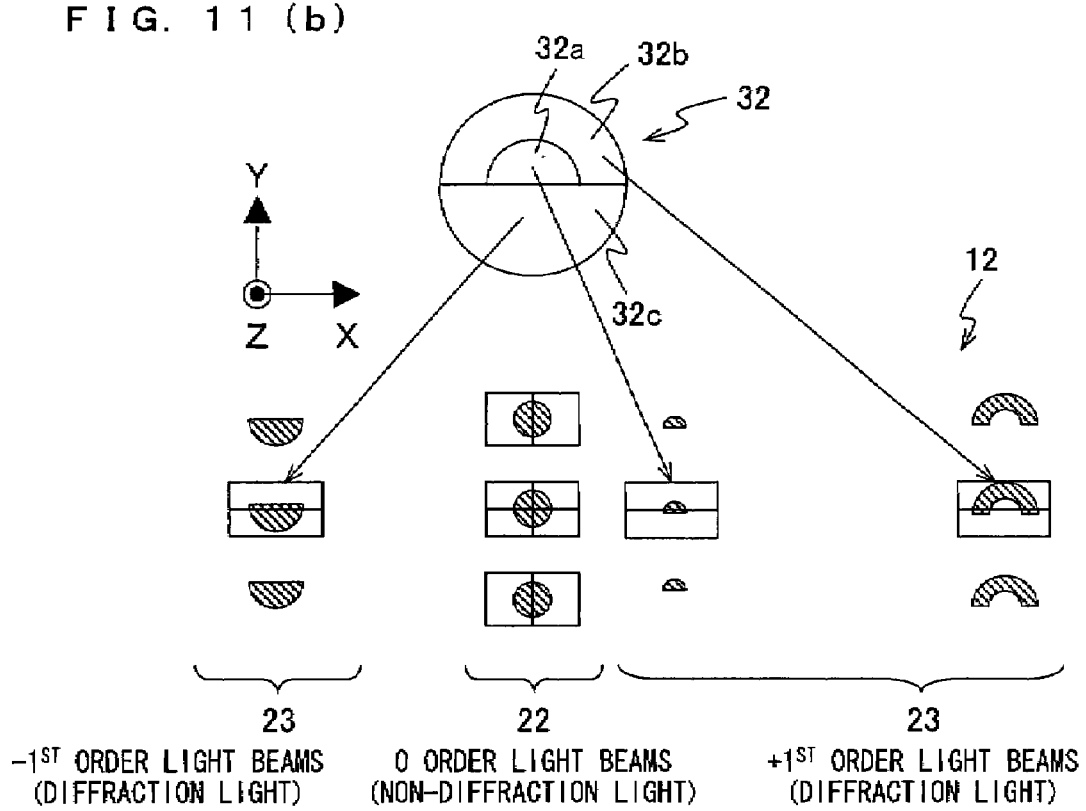

Each of FIG. 11(a) and FIG. 11(b) illustrates a relation between a division pattern of the second polarization hologram element 32 and the pattern of the light receiving sections of the light receiving element 12. FIG. 11(a) illustrates the light beams incidenting on the light receiving element 12 after being focused and collected on the recording layer 4c of the optical disk 4 (see FIG. 2) by adjusting the position of the collimator lens 2 in the optical axis direction such that the light beams collected by the objective lens 3 do not have spherical aberration with respect to the thickness of the cover layer 4b of the optical disk 4.

As shown in FIG. 11(a), the light receiving element 12 is made up of fourteen light receiving sections 12a through 12n. The three light beams 21, formed by the first polarization hologram element 31, head for the optical disk 4, and are so reflected by the optical disk 4 as to head for the optical integrated unit. Then, the light beams thus reflected are divided by the second polarization hologram element 32 into the non-diffraction light beams (0 order diffraction light beams) 22 and the diffraction light beams ($\pm 1^{st}$ order diffraction light beams) 23.

Among the non-diffraction light beams (0 order diffraction light beams) 22 and the diffraction light beams ($\pm 1^{st}$ order diffraction light beams), the light receiving sections provided in the light receiving element 12 receive light beams required for detection of the RF signal and the servo signals. Specifically, the light beams formed by the second polarization hologram element 32 are 12 light beams: three non-polarized light beams (0 order diffraction light beams) 40, six $+1^{st}$ order diffraction light beams 41, and three $-1^{st}$ order diffraction light beams 42. The hologram pattern of the second polarization hologram element 32 is blazed. That is, the second polarization hologram element 32 has a grating whose cross sectional surface is in the form of either an inclined plane or a stairway. In the present embodiment, each of the regions 32a and 32b has such a cross sectional surface that light intensities of the $+1^{st}$ order diffraction light beams become intensive, and the region 32c has such a cross sectional surface that light intensities of the $-1^{st}$ order diffraction light beams become intensive. With this, light intensities of the unnecessary diffraction light beams are restrained and the light intensities of the diffraction light beams to be used for the signal detection are increased, with the result that signal quality of each of the detected signals can be improved. However, the second polarization hologram element 32 also generates the non-diffraction light beams, so that it is impossible to completely eliminate the unnecessary diffraction light beams. For this reason, the light receiving sections 12i through 12n of the light receiving element 12 are so designed as to sufficiently secure a space in the x axis direction such that the light receiving section 12i through 12n do not receive the unnecessary diffraction light beams (not shown).

Note that FIG. 11(b) illustrates the light beams incidenting on the light receiving element 12 in cases where the objective lens 3 shown in FIG. 2 comes closer to the optical disk 4 from a position at which the objective lens 3 is positioned in the case of FIG. 11(a). When the objective lens 3 comes closer to the optical disk 4, the respective beam diameters of the light beams become larger, but the light beams do not go off from the light receiving sections.

As such, both the $+1^{st}$ order diffraction light beams and $-1^{st}$ order diffraction light beams are used, so that offset adjustment for the FES signal detected in accordance with the double knife edge method can be securely carried out by rotating the polarized light diffraction element 15 with respect to the optical axis.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

An optical integrated unit according to the present invention makes it possible to reduce influences, occurring due to change over time and temperature change, by increasing the size of a beam diameter of light incidenting on a diffraction element. Moreover, the optical integrated unit makes it easy to manufacture the diffraction element by lengthening an optical path length from the diffraction element to a light receiving element so as to reduce a diffraction angle (so as to make a grating pitch larger). Moreover, the optical integrated unit makes it possible to realize high-speed responsiveness (high-speed reproduction carried out by rotating an optical disk at high speed) by detecting an RF signal with the use of non-diffraction light beams obtained by the diffraction element.

Thus, the present invention is suitably usable for (i) an optical integrated unit for realizing downsizing of an optical pickup used to carry out information recording or information reproduction with respect to an optical recording medium such as an optical disk, and (ii) an optical pickup device including the optical integrated unit.

The invention claimed is:

1. An optical integrated unit, comprising:
a light source for emitting a light beam;
light guiding means, so provided as to cross with an optical axis of the light beam, the light guiding means having a function surface that allows passage of the light beam and that reflects returning light, which is the light beam reflected by an optical information recording medium, and guiding the returning light in a direction different from a direction toward the light source;
a light receiving element for receiving the returning light guided by the light guiding means; and
diffraction means, which diffracts the light beam and the returning light and is provided in a position where the diffraction means crosses with an optical axis of the light beam and where the light beam having passed through the function surface enters, wherein:
the diffraction means is a polarized light diffraction element including a first hologram region and a second hologram region, each of which diffracts polarized light having a predetermined polarization plane, and each of which never diffracts polarized light having a polarization plane perpendicular to said predetermined polarization plane but allows passage of the polarized light, and
the first hologram region and the second hologram region are so provided as to cross with the optical axis of the light beam, and are provided such that the polarization plane of the polarized light to be diffracted by the first hologram region is perpendicular to the polarization plane of the polarized light to be diffracted by the second hologram region;
the first hologram region divides the returning light into non-diffraction light and diffraction light;
the light receiving element has (i) a light receiving section for receiving the diffraction light, and (ii) a light receiving section for receiving the non-diffraction light; and
the non-diffraction light is used for detection of high-speed signals.

2. Art optical integrated unit, comprising:
a light source for emitting a light beam;
light guiding means, so provided as to cross with an optical axis of the light beam, the light guiding means having a function surface that allows passage of the light beam and that reflects returning light, which is the light beam reflected by an optical information recording medium, and guiding the returning light in a direction different from a direction toward the light source;
a light receiving element for receiving the returning light guided by the light guiding means; and
a first diffraction element and a second diffraction element provided in a position where the first and second diffraction elements cross with the optical axis of the light beam and where the light beam having passed through the function surface enters, the first diffraction element allowing passage of the returning light and diffracting the light beam emitted from the light source, the second diffraction element allowing passage of the light beam and dividing the returning light into non-diffraction light and diffraction light,
wherein:
the light receiving element receives the diffraction light and the non-diffraction light diffracted by the second diffraction element; and
the non-diffraction light is used for detection of an RF signal which is a high-speed signal, and only the non-diffraction light is used for detection of the RF signal.

3. The optical integrated unit as set forth in claim 2, wherein either the first diffraction element or the second diffraction element is a polarized light diffraction element, which diffracts polarized light having a predetermined polarization plane, and which never diffracts polarized light having a polarization plane perpendicular to said predetermined polarization plane but allows passage of the polarized light.

4. The optical integrated unit as set forth in claim 3, wherein:
the first diffraction element and the second diffraction element are integrated into a single polarized light diffraction element including a first hologram region and a second hologram region, each of which diffracts polarized light having a predetermined polarization plane, and each of which never diffracts polarized light having a polarization plane perpendicular to said predetermined polarization plane but allows passage of the polarized light, and
the first hologram region and the second hologram region are so provided as to cross with the optical axis of the light beam, and are provided such that the polarization plane of the polarized light to be diffracted by the first hologram region is perpendicular to the polarization plane of the polarized light to be diffracted by the second hologram region.

5. The optical integrated unit as set forth in claim 2, wherein the non-diffraction light is used also for detection of a TES signal, which is a high-speed signal, in accordance with a DPD method.

6. The optical integrated unit as set forth in claim 2, wherein the diffraction light is used for detection of a servo signal.

7. The optical integrated unit as set forth in claim 2, wherein the light source is a semiconductor laser contained in a hermetically sealed package.

8. The optical integrated unit as set forth in claim 7, wherein a position of the light source is adjustable with respect to the light receiving element and the light guiding means.

9. The optical integrated unit as set forth in claim 2, wherein a ¼ wavelength plate, provided on a side of either the first diffraction element or the second diffraction element, which side is opposite to a side on which the light guiding means is provided.

10. The optical integrated unit as set forth in claim 2, further comprising a ½ wavelength plate, provided between the light source and the function surface so as to cross with the optical axis of the light beam emitted from the light source.

11. The optical integrated unit as set forth in claim 2, wherein the light source is separated from the first diffraction element by a distance of 3 mm to 7 mm on the basis of optical path length in the air.

12. The optical integrated unit as set forth in claim 2, wherein the second diffraction element is separated from the light receiving element by a distance of 3 to 7 mm on the basis of optical path length in the air.

13. An optical pickup device, comprising:
a light source for emitting a light beam;
light guiding means, so provided as to cross with an optical axis of the light beam, the light guiding means having a function surface that allows passage of the light beam and that reflects returning light, which is the light beam reflected by an optical information recording medium, and guiding the returning light in a direction different from a direction toward the light source;
a light receiving element for receiving the returning light guided by the light guiding means; and
a first diffraction element and a second diffraction element provided in a position where the first and second diffraction elements cross with the optical axis of the light beam and where the light beam having passed through the function surface enters, the first diffraction element allowing passage of the returning light and diffracting the light beam emitted from the light source, the second diffraction element allowing passage of the light beam and dividing the returning light into non-diffraction light and diffraction light, wherein:
the light receiving element receives the diffraction light and the non-diffraction light diffracted by the second diffraction element; and
the non-diffraction light is used for detection of an RF signal which is a high-speed signal, and only the non-diffraction light is used for detection of the RE signal.

14. An optical pickup device,
a light source for emitting a light beam;
light guiding means, so provided as to cross with an optical axis of the light beam, the light guiding means having a function surface that allows passage of the light beam and that reflects returning light, which is the light beam reflected by an optical information recording medium, and guiding the returning light in a direction different from a direction toward the light source;
a light receiving element for receiving the returning light guided by the light guiding means; and
diffraction means, which diffracts the light beam and the returning light and is provided in a position where the diffraction means crosses with the optical axis of the light beam and where the light beam having passed through the function surface enters, wherein:
the diffraction means is a polarized light diffraction element including a first hologram region and a second hologram region, each of which diffracts polarized light having a predetermined polarization plane, and each of which never diffracts polarized light having a polarization plane perpendicular to said predetermined polarization plane but allows passage of the polarized light;
the first hologram region and the second hologram region are so provided as to cross with the optical axis of the light beam, and are provided such that the polarization plane of the polarized light to be diffracted by the first hologram region is perpendicular to the polarization plane of the polarized light to be diffracted by the second hologram region;
the first hologram region divides the returning light into non-diffraction light and diffraction light;
the light receiving element has (i) a light receiving section for receiving the diffraction light, and (ii) a light receiving section for receiving the non-diffraction light; and
the non-diffraction light is used for detection of high-speed signals.

* * * * *